(12) United States Patent
Zhang

(10) Patent No.: US 11,265,035 B1
(45) Date of Patent: Mar. 1, 2022

(54) MOBILE DEVICE HOLDER

(71) Applicant: Ping Zhang, Cranberry Township, PA (US)

(72) Inventor: Ping Zhang, Cranberry Township, PA (US)

( * ) Notice: Subject to any disclaimer, the term of this patent is extended or adjusted under 35 U.S.C. 154(b) by 0 days.

(21) Appl. No.: 17/367,500

(22) Filed: Jul. 5, 2021

(30) Foreign Application Priority Data

Feb. 8, 2021 (CN) .......................... 202120353425.6
Feb. 8, 2021 (CN) .......................... 202120353429.4

(51) Int. Cl.
| | |
|---|---|
| *H04B 1/3877* | (2015.01) |
| *H04M 1/04* | (2006.01) |
| *F16M 11/14* | (2006.01) |
| *F16B 1/00* | (2006.01) |

(52) U.S. Cl.
CPC ............. *H04B 1/3877* (2013.01); *F16B 1/00* (2013.01); *F16M 11/14* (2013.01); *H04M 1/04* (2013.01); *F16B 2001/0035* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,888,940 | B1 * | 5/2005 | Deppen | B60R 11/0241 |
| | | | | 379/446 |
| 9,397,717 | B2 * | 7/2016 | Curran | H04M 1/0281 |
| 9,723,910 | B2 * | 8/2017 | Due | A45F 5/10 |
| 10,278,299 | B2 * | 4/2019 | Kim | E05D 3/022 |
| 10,362,697 | B2 * | 7/2019 | Yuan | F16M 11/041 |
| 10,419,054 | B1 * | 9/2019 | VanTassell | H04M 1/04 |
| 10,581,480 | B1 * | 3/2020 | Kim | H04M 1/04 |
| 10,627,046 | B1 * | 4/2020 | Jang | G06F 1/1626 |
| 11,039,679 | B2 * | 6/2021 | Jang | A45F 5/10 |
| 11,190,035 | B2 * | 11/2021 | Sobh | H02J 7/0045 |
| 2013/0279098 | A1 * | 10/2013 | Cho | G06F 1/1626 |
| | | | | 361/679.01 |
| 2016/0039357 | A1 * | 2/2016 | Jang | A45F 5/00 |
| | | | | 224/567 |
| 2017/0104854 | A1 * | 4/2017 | Park | A45C 11/00 |
| 2018/0220782 | A1 * | 8/2018 | Mody | A45F 5/00 |
| 2019/0230205 | A1 * | 7/2019 | Lee | H04M 1/04 |

\* cited by examiner

*Primary Examiner* — Monica E Millner
(74) *Attorney, Agent, or Firm* — IPro, PLLC

(57) ABSTRACT

A mobile device holder includes an attachment assembly and a support assembly. The attachment assembly includes a magnet enclosed in a shell. When brought into proximity to a magnetic part of a mobile device, the magnet causes the mobile device holder to be attached to the mobile device by magnetic attraction. The magnet has a ring shape. Toward the center of the ring-shaped magnet, the attachment assembly has an accommodating recess. The support assembly includes a handle that is movable on a hinge in and out of the accommodating recess. The joint permits the handle to rotate about a first axis and a second axis not parallel to the first axis.

28 Claims, 28 Drawing Sheets

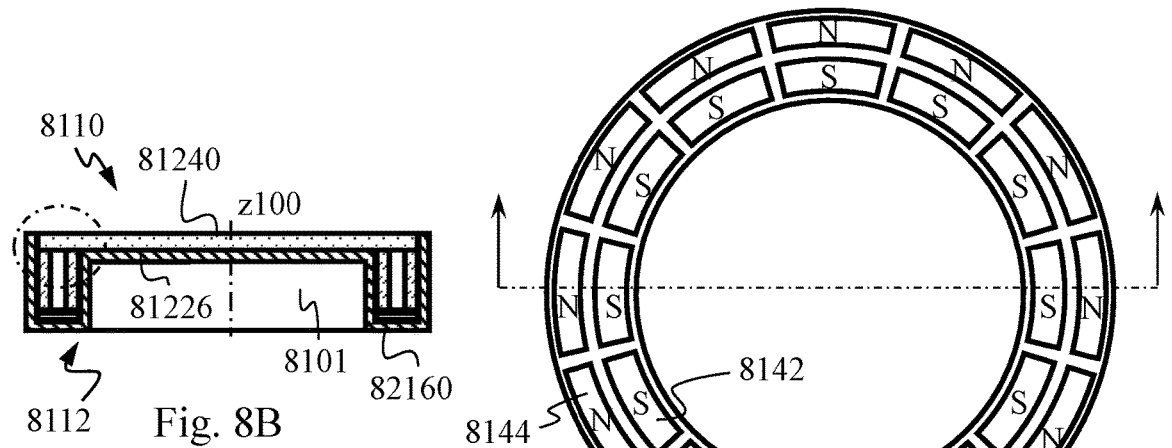
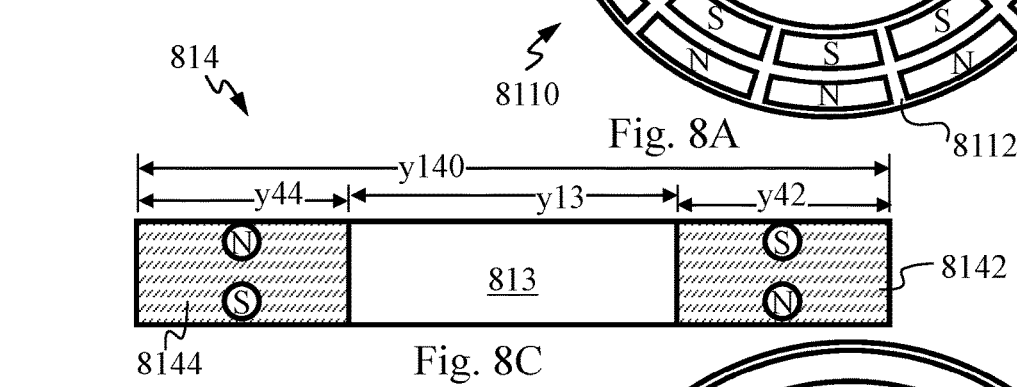
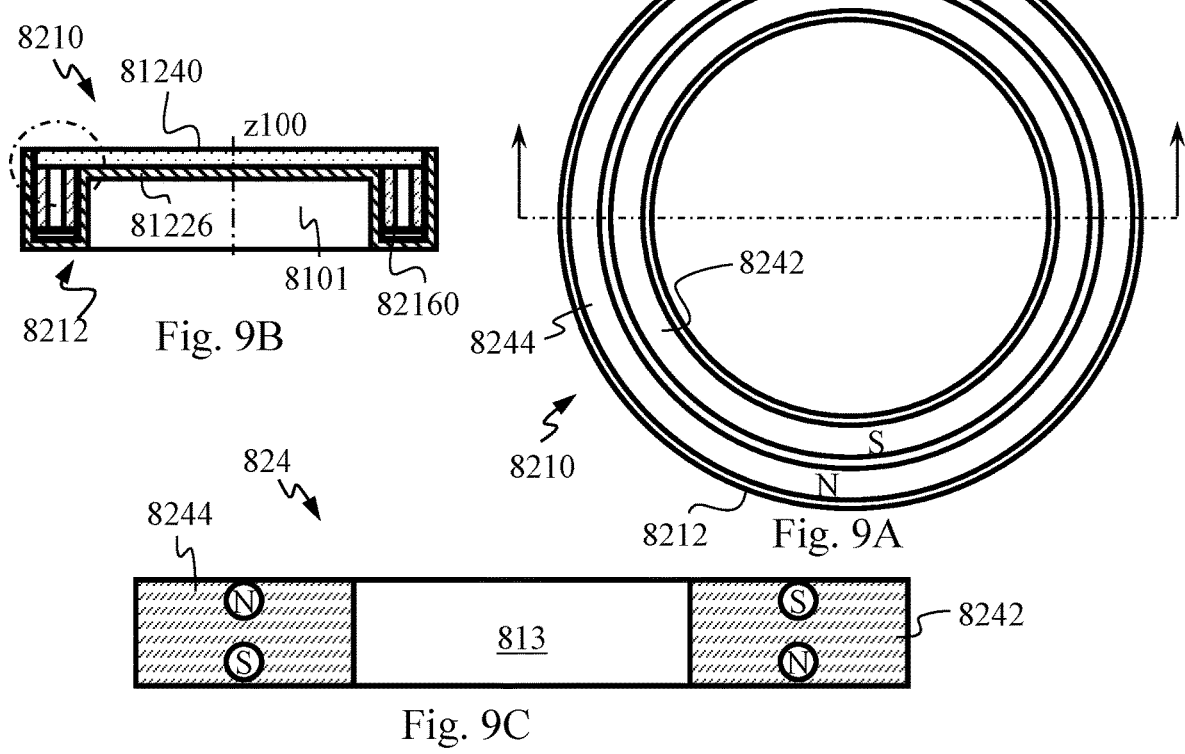

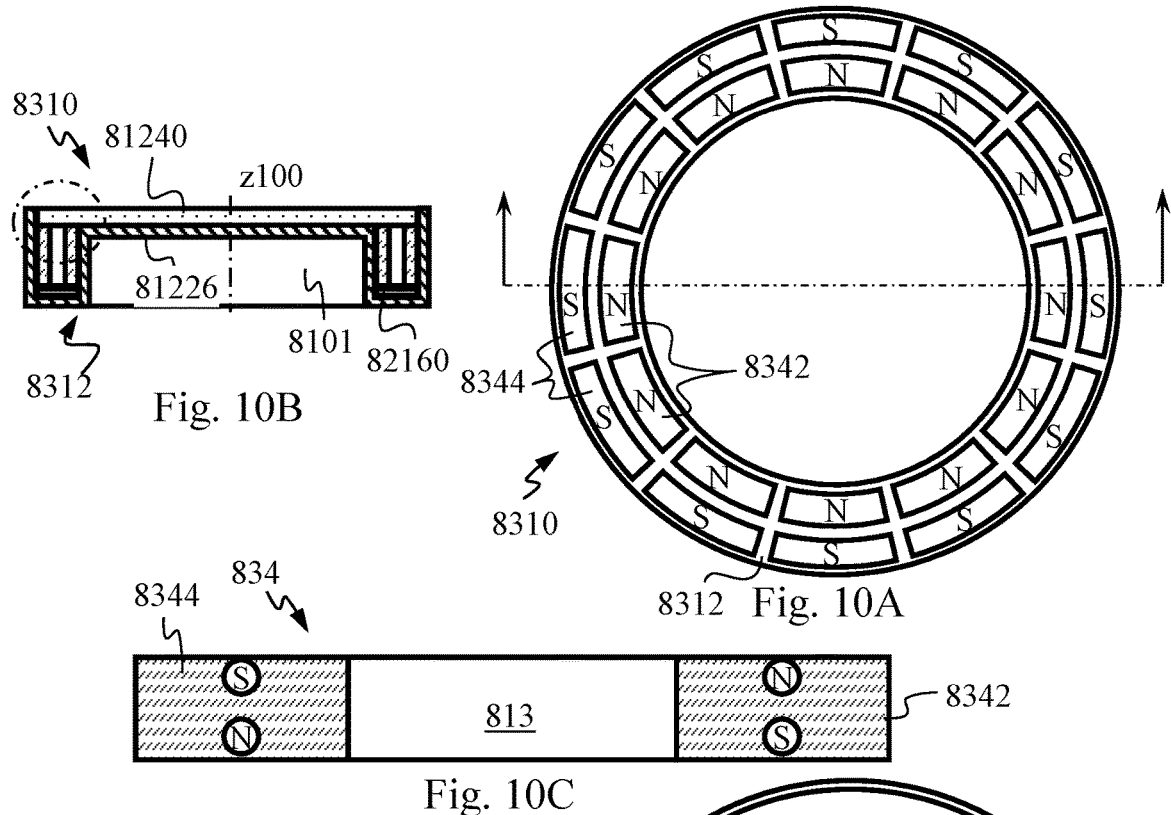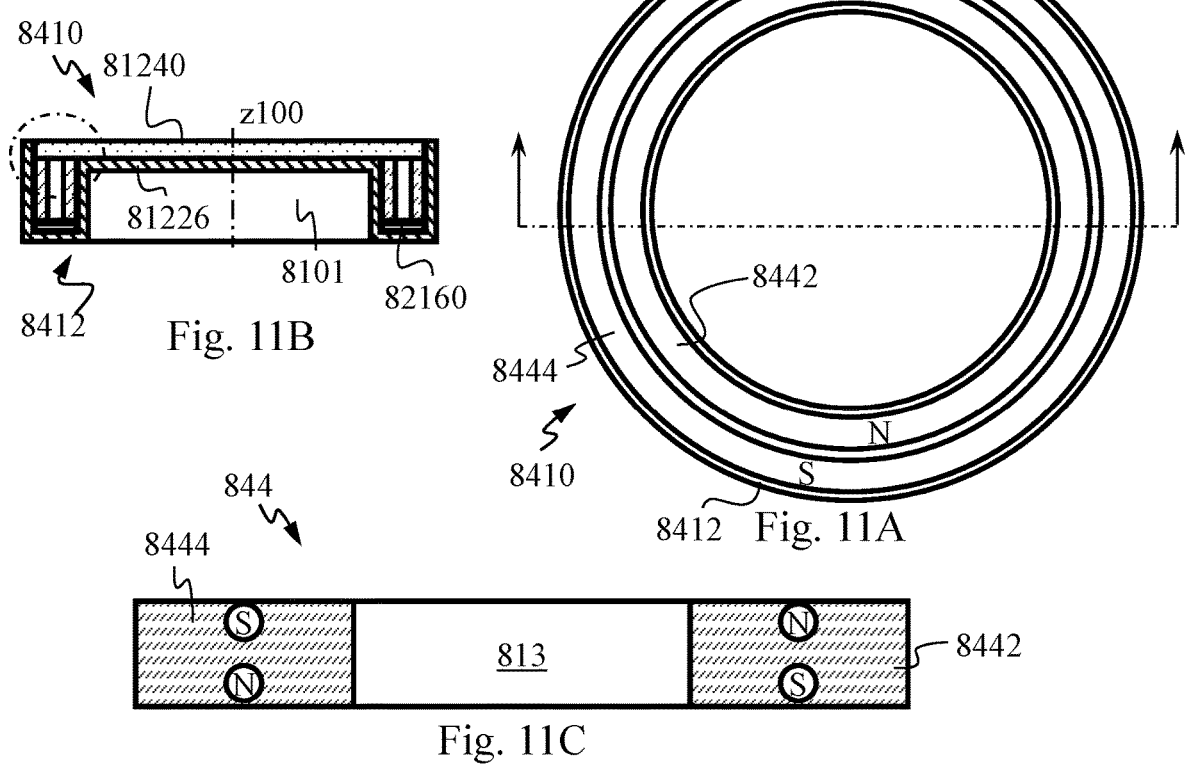

MOBILE DEVICE HOLDER

TECHNICAL FIELD

The disclosure herein relates to accessories for mobile devices, and more particularly to accessories to aid in holding a mobile device in the hand and devices and methods for attaching the same to mobile devices.

BACKGROUND

Mobile devices, including portable media players, personal digital assistants, tablets, and smartphones, can be used while being held in a hand or hands. A variety of devices have been proposed to aid in improving a user's grip on a mobile device while in use.

SUMMARY

Disclosed herein is a mobile device holder that has an attachment assembly and a support assembly connected to the attachment assembly. The attachment assembly is configured to produce a magnetic force parallel to a primary axis of the mobile device holder due to a ring-shaped magnet enclosed inside the attachment assembly. The magnet causes the attachment assembly to magnetically attract to a magnetic part of a mobile device, such as a permanent magnet or an electromagnet provided inside the mobile device. The magnetic part in the mobile device can include at least one component of an inductive charging system.

The support assembly includes a handle portion connected to a joint portion that permits the handle portion to be moved by a user's fingers between a closed position and an open position. The closed position is proximal to the attachment assembly. The open position is distal from the attachment assembly. The primary axis is normal to a contact surface that contacts the mobile device when the mobile device holder is in use with the mobile device. The joint portion includes at least one of a foldable segment and a rotatable part. The rotatable part is configured to rotate about a secondary axis. The secondary axis that is not parallel to the primary axis. The secondary axis can be perpendicular to the primary axis.

In addition to the foldable segment or the rotatable part, the joint portion can include a shaft and a circular profile such as a bushing or a bearing to permit rotation about the primary axis. In the closed position, the handle portion Is received into an accommodating recess in the attachment assembly. The ring-shaped magnet surrounds a circumference of the accommodating recess. In the open position, the handle portion extends out of the accommodating recess.

The attachment assembly includes a shell that encloses the magnet. The shell includes an inner wall that circumferentially bounds the accommodating recess. The shell includes an outer wall that surrounds the inner wall. The shell includes a base wall that extends radially between neighboring bottom edges of the outer wall and the inner wall to form a concave groove portion. The magnet resides in the concave groove portion.

The shell includes a top wall that extends radially between top edge portions of the inner wall. A thin disk-shaped cover extends radially between the top wall and a top edge portion of the outer wall to enclose the magnet in the groove portion. An adhesive fixes the cover to the top wall. An outer surface of the cover, on a side not affixed to the top wall, includes a soft material, e.g., leather, silicone, or sponge.

The outer wall of the shell is interrupted by at least one indentation that connects to the accommodating recess to expose a surface of the handle in the closed position. The exposed surface of the handle permits the handle to be moved from the closed position to the open position through the indentation, e.g., by a fingertip of a user. The mobile device holder can have a plurality of the indentations in the outer wall of the shell.

The magnet has a ring shape formed by an inner magnetic unit and an outer magnetic unit spaced apart from one another by a non-magnetized zone.

The inner and outer magnetic units, respectively, can be single pieces. Each of the inner and outer magnetic units can be a circular array of magnetic sub-units. The magnetic units and sub-units can be attached to a support piece. The support piece can be ferrous or non-ferrous. The support piece can be fixed by adhesive to the shell.

The magnetic units and sub-units can have their poles aligned in a single direction, in opposing directions, and in alternating opposing directions.

The support assembly can include a hub that rotates on a bearing around the primary axis. The handle portion can include a hoop that surrounds an outer rim of the hub and pivots about the secondary axis by a rotatable part on an outer rim of the hub.

BRIEF DESCRIPTION OF FIGURES

FIG. 8A shows a schematic top view according to an embodiment.

FIG. 8B shows a schematic cross-sectional side view according to an embodiment.

FIG. 8C shows a detailed schematic view according to an embodiment.

FIG. 9A shows a schematic top view according to an embodiment.

FIG. 9B shows a schematic cross-sectional side view according to an embodiment.

FIG. 9C shows a detailed schematic view according to an embodiment.

FIG. 10A shows a schematic top view according to an embodiment.

FIG. 10B shows a schematic cross-sectional side view according to an embodiment.

FIG. 10C shows a detailed schematic view according to an embodiment.

FIG. 11A shows a schematic top view according to an embodiment.

FIG. 11B shows a schematic cross-sectional side view according to an embodiment.

FIG. 11C shows a detailed schematic view according to an embodiment.

DETAILED DESCRIPTION

Figure 1:
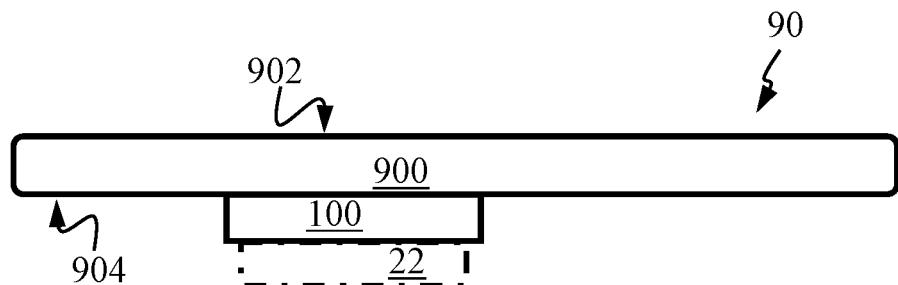
FIG. 1 shows a side view of a system according to an embodiment.

FIG. 1 schematically shows a mobile device 900 and a mobile device holder 100, according to an embodiment. In various embodiments, a system 90 comprises the mobile device 900 and the mobile device holder 100. The mobile device holder 100 is shown attached to a back surface 904 of the mobile device 900. The mobile device holder 100 abuts the back surface 904. The back surface 904 of the mobile device 900 is opposite a front surface 902 of the mobile device 900. In various embodiments, mobile devices such as the mobile device 900 include portable media players, personal digital assistants, tablets, smartphones, and the like. In exemplary embodiments, the front surface 902 of the mobile device 900 includes a touch-sensitive screen, such as a resistive or capacitive touchscreen, made of a glass or plastic, while the back surface 904 is made of a metal, such as aluminum, a glass, a plastic, or a combination of these. The mobile device holder 100 includes a handle portion 22. In various embodiments, the mobile device holder 100 improves a user's capacity to hold and use the mobile device 900. In particular, the handle portion 22 provides an ergonomic and comfortable structure for the user to hold between and around the fingers, including the thumb and knuckles, and palm of the hand. Some mobile device stands attach to mobile devices by a glue layer or a suction cup. But this often requires a high degree of flatness and cleanliness on a surface of a mobile device to which such stand is attached. By contrast, various embodiments in accordance with the present disclosure operate even where a surface to which the mobile device holder 100 is attached has a lower degree of flatness or cleanliness.

Figure 2A:
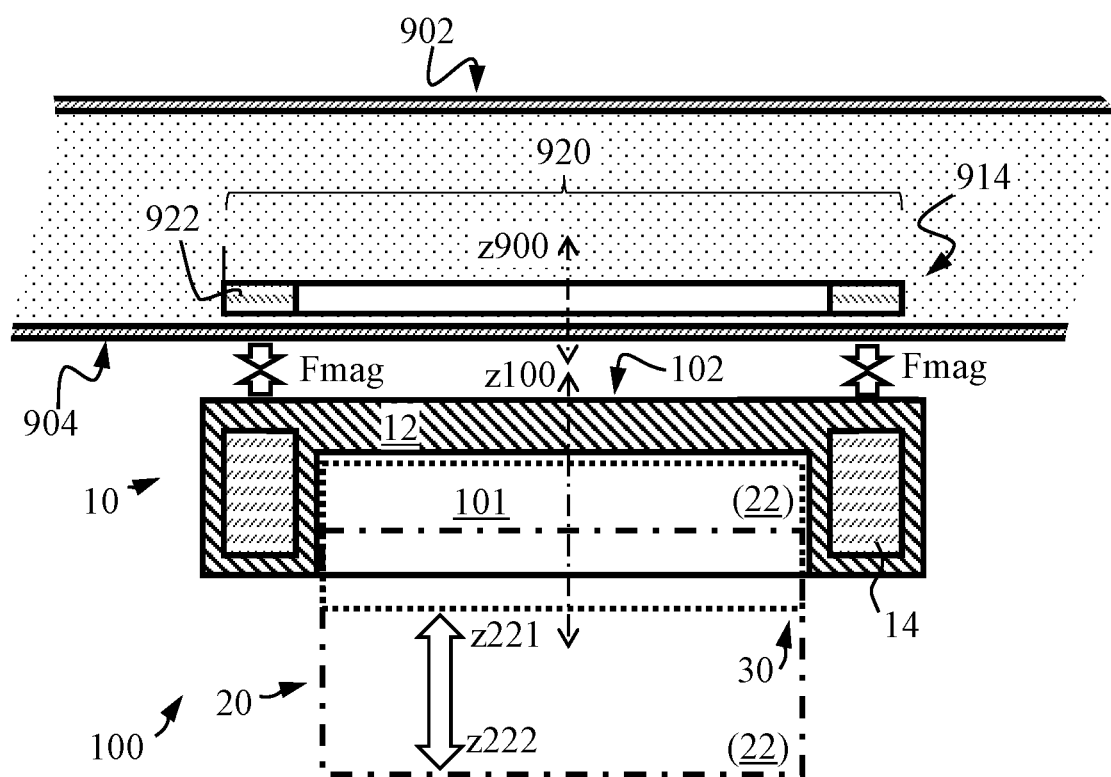
FIG. 2A shows a cross-sectional side view of a system according to an embodiment.

FIG. 2A schematically shows a cross-sectional side view of the mobile device holder 100, according to an embodiment. The mobile device 900 includes a magnetic part 914. According to various embodiments, the magnetic part 914 is ferromagnetic, electromagnetic, or both. According to various embodiments, the magnetic part 914 has the form of a toroid 920 of a rectangular cross-section 922, or in other words, the shape can be understood as a revolution of the rectangular cross-section 922 around a magnet axis z900. In other embodiments the cross-section 922 has a non-rectangular shape. The magnetic part 914 lies in a plane parallel to the back surface 904. In some embodiments, the magnetic part 914 is spaced apart from the back surface 904.

Still referring to FIG. 2A, the mobile device holder 100 includes an attachment assembly 10 and a support assembly 20. The attachment assembly 10 is configured to produce a magnetic force Fmag parallel to a primary axial direction z100 of the mobile device holder 100. The force Fmag is produced by an interaction between a magnet 14 enclosed in a base shell 12 of the attachment assembly 10 and the magnetic part 914 enclosed in the mobile device 900. According to various embodiments, when in use, the primary axis z100 of the mobile device holder 100 aligns with the magnet axis z900 of the mobile device 900. The support assembly 20 connects to the attachment assembly 10. The support assembly 20 includes a handle portion 22. A joint portion 30 permits the handle portion 22 to be moved between a closed position z221 proximal to the attachment assembly 10 and an open position z222 distal from the attachment assembly 10. The joint portion 30 connects the handle portion 22 to the support assembly 20.

FIG. 2A schematically shows the handle portion 22 as a rectangle having a dashed outline. According to various embodiments, the joint portion 30 operates by sliding, flexing, folding, twisting, rotating, or the like. The joint portion 30 permits the handle portion 22 to be moved in and out of an accommodating recess 101 on the bottom side of the attachment assembly 10.

Still referring to FIG. 2A, in various embodiments, the attachment assembly 10 has a contact surface 102 that abuts the back surface 904 of the mobile device 900 in use. The primary axis z100 is normal to the contact surface 102.

Figure 2B:
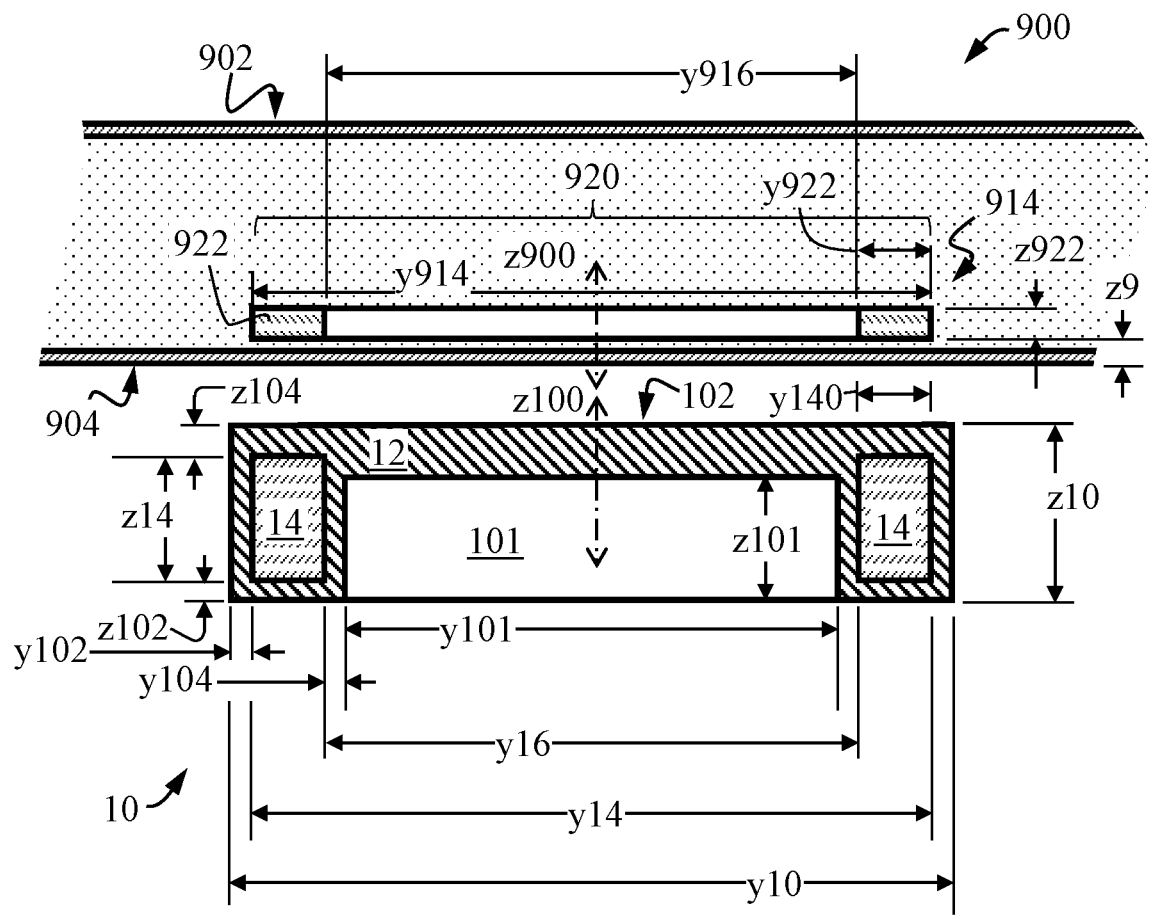
FIG. 2B shows a cross-sectional side view of a system according to an embodiment.

FIG. 2B schematically shows a cross-sectional side view of the mobile device holder 100, consistent with the view shown in FIG. 2A. In various embodiments, the magnetic part 914 has an overall outer diameter y914 and an overall inner diameter y916. The rectangular cross-section 922 of the magnetic part 914 has a height z922 and a width y922. The magnetic part 914 has the same overall height z922 as the cross-section 922. The magnet axis z900 of the mobile device 900 passes through the centroid of the magnetic part 914. The magnetic part 914 is spaced apart from the back surface 904 a distance z9.

Still referring to FIG. 2B, the attachment assembly 10 has a generally cylindrical shape with an overall outer diameter y10 and an overall height z10. The accommodating recess 101 on the bottom side of the attachment assembly 10 has a generally cylindrical shape with an overall diameter y101 and an overall height z101. The magnet 14 is generally ring-shaped and surrounds the accommodating recess 101 in the radial direction. The magnet has an overall outer diameter y14 and an overall inner diameter y16. The magnet 14 has a generally rectangular cross-section of width y140 and height z14. The attachment assembly 10 has a bottom wall of thickness z102 below the magnet 14, a wall of thickness z104 above the magnet 14, an outer wall of thickness y102 radially outside the magnet 14, and an inner wall of thickness y104 radially inside the magnet 14.

Still referring to FIG. 2B, in some embodiments, the magnetic part 914 and the magnet 14 have the same shape and size, in that the overall outer diameter y14 of the magnet 14 equals the overall outer diameter y914 of the magnetic part 914; and the overall inner diameter y16 of the magnet 14 equals the overall inner diameter y916 of the magnetic part 914. In some embodiments, the overall height z14 of the magnet 14 equals the overall height z922 of the magnetic part 914. In other embodiments, the overall height z14 does not equal the overall height z922.

Still referring to FIG. 2B, in various embodiments, the overall outer diameter y914 of the magnetic part 914 is from 49 to 55 mm, from 53 to 59 mm, or 54.1 mm. The overall inner diameter y916 of the magnetic part 914 is from 41 to 47 mm, from 45 to 51 mm, or 46 mm. In some embodiments, the magnetic part 914 is fixed inside the mobile device 900 centered on a location within ±0.30 mm of the center of the mobile device 900 on a plane parallel to the back surface 904. In some embodiments, the overall inner diameter y916 of the magnetic part 914 has a circularity of 0.05 mm in relation to the overall outer diameter y914 of the magnetic part 914.

Still referring to FIG. 2B, in various embodiments, the overall height z922 of the magnetic part 914 is from 0.25 to 0.60 mm, from 0.50 to 0.85 mm, or 0.55 mm. The distance z9 from the magnetic part 914 to the back surface of the mobile device 900 is from 0.05 to 0.40 mm, from 0.25 to 0.55 mm, or up to 0.85 mm.

Figure 2C:
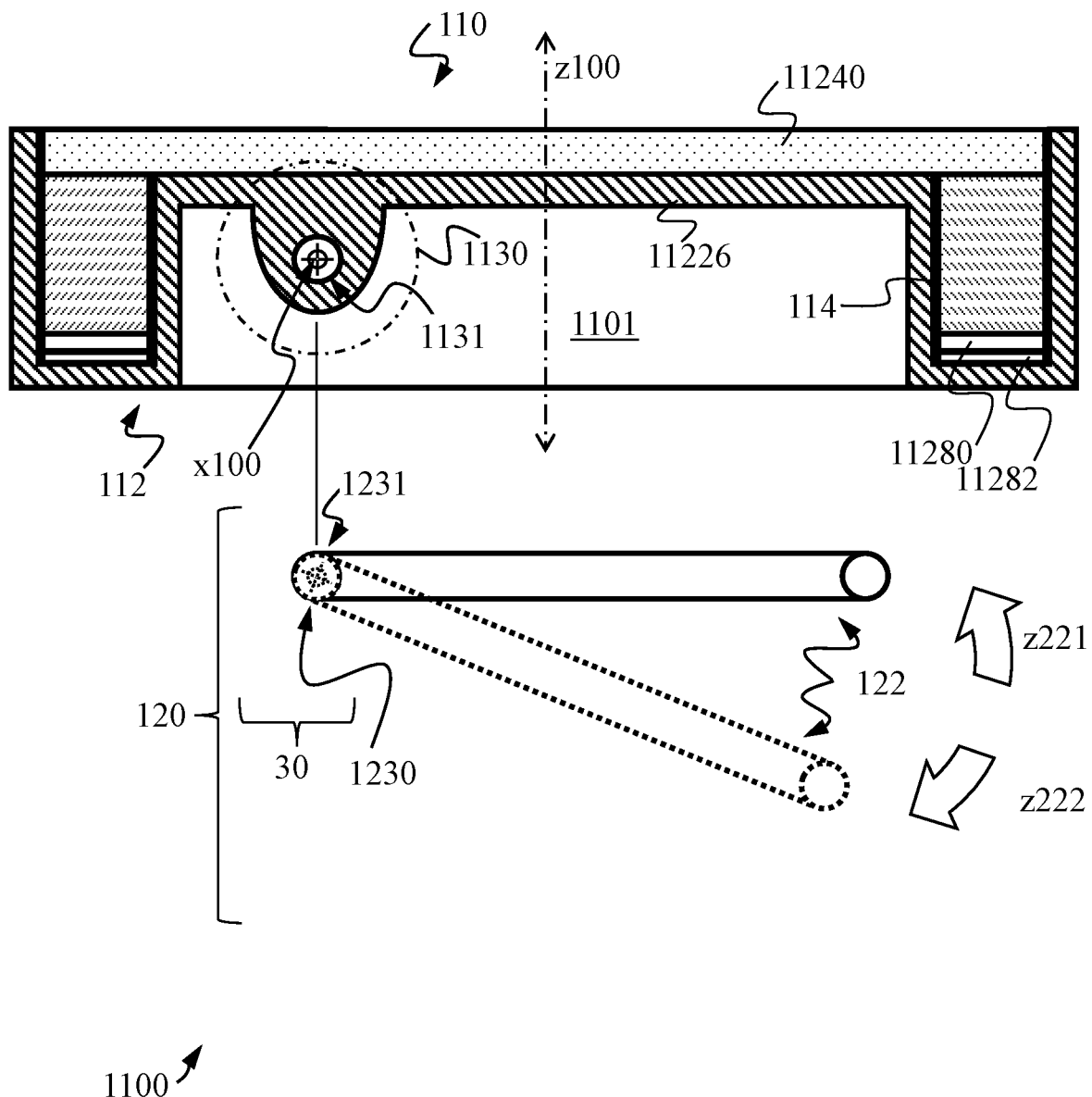
FIG. 2C shows a cross-sectional side view according to an embodiment.

FIG. 2C shows a partially exploded schematic cross-sectional side view of a mobile device holder 1100 according to an embodiment. The mobile device holder 1100 includes an attachment assembly 110 and a support assembly 120. The attachment assembly 110 includes a base shell 112 and a cover body 11240 that enclose a ring-shaped magnet 114. Some embodiments include a support piece 11280 on one side of the ring-shaped magnet 114. In some embodiments, an adhesive 11282, such as glue or epoxy, fixes the support piece 11280 inside the base shell 112.

Still referring to FIG. 2C, the base shell 112 has a top wall 11226 that extends radially across a plane normal to the primary axis z100. The base shell 112 and the cover body 11240 are assembled by fixing the cover body 11240 to the top wall 11226. In various embodiments, the cover body 11240 is fixed by an adhesive, such as glue or epoxy, to the top wall 11226. The base shell 112 includes a support connection part 11230 that extends from a side of the top wall 11226 opposite the cover body 11240. The support connection part 11230 extends parallel to the primary axis z100 away from the top wall 11226 to interface with an attachment connection part 1230 of the support assembly 120. The support connection part 11230 includes a hole part 1131 that extends along a secondary axis x100 perpendicular to the primary axis z100.

Still referring to FIG. 2C, the support assembly 120 includes a hoop-shaped handle portion 122 that is movable between the closed position z221 and the open position z222. The support assembly 120 includes the attachment connection part 1230. The attachment connection part 1230 includes a rotatable shaft part 1231 that can pivot about the secondary axis x100 when assembled with the corresponding hole part 1131 of the support connection part 11230. In an embodiment, the joint portion 30 encompasses the hole part 1131 and the rotatable shaft part 1231. The support connection part 11230 occupies only part of the space beneath the top wall 11226 and radially inward of the ring-shaped magnet 114 and the base shell 112. The remaining space comprises an accommodating recess 1101. In the closed position z221, the handle portion 122 fits completely in the accommodating recess 1101. To move from the closed position z221 to the open position z222, the handle portion 122 pivots about the secondary axis x100.

Figure 3A:
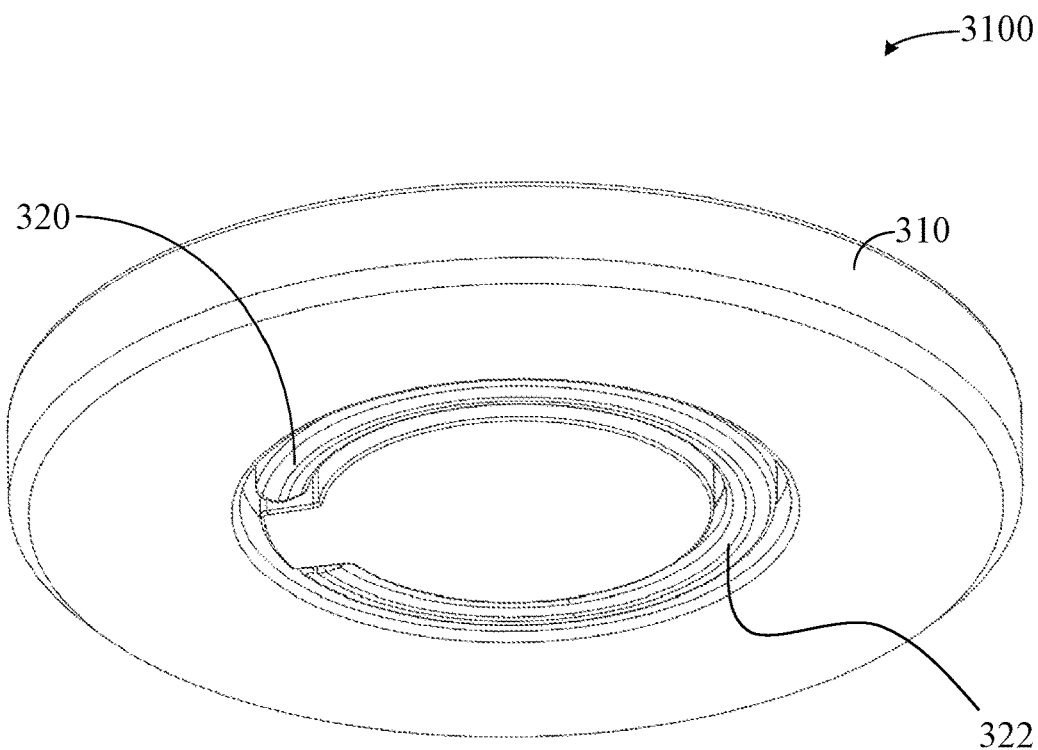
FIG. 3A shows a perspective view according to an embodiment.

FIG. 3A shows a perspective view of a mobile device holder 3100 according to an embodiment. The mobile device holder 3100 includes an attachment assembly 310 and a support assembly 320. The support assembly 320 includes a handle portion 322. FIG. 3A shows the handle portion 322 in the closed position z221. FIG. 3I shows the handle portion 322 in the open position z222.

Figure 3B:
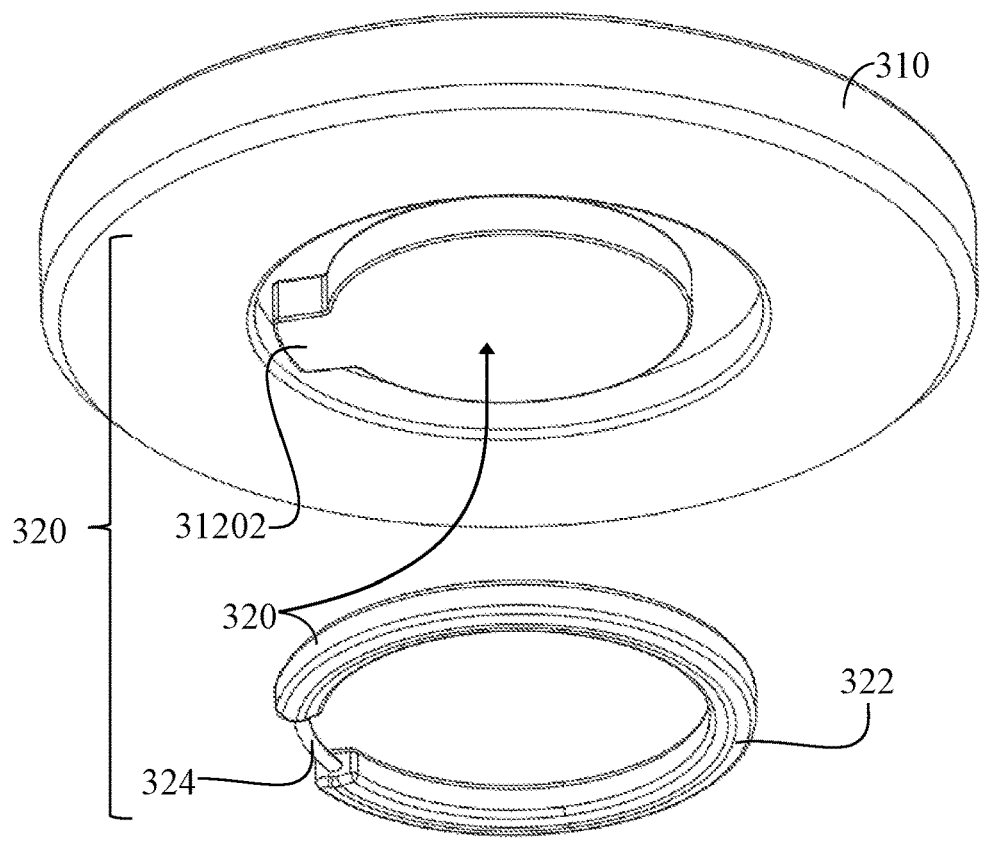
FIG. 3B shows an exploded perspective view according to an embodiment.

FIG. 3B shows an exploded perspective view of the support assembly 320.

Figure 3C:
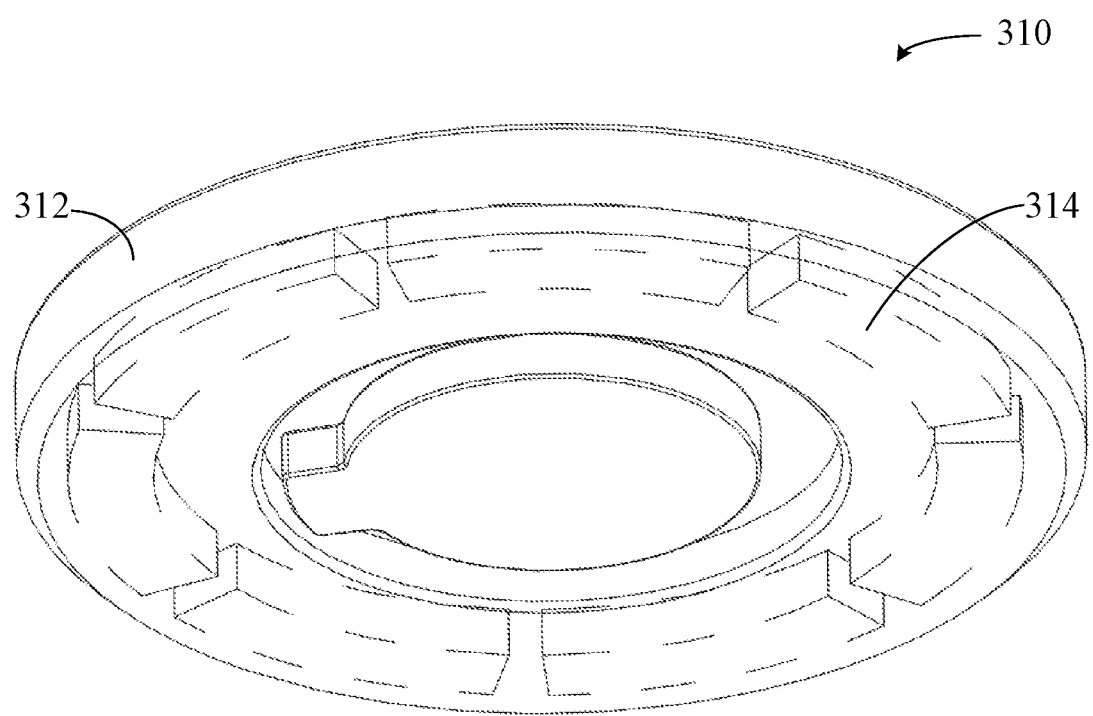
FIG. 3C shows a perspective view according to an embodiment.

FIG. 3C schematically shows a perspective view of the attachment assembly 310, including a base shell 312 and a magnet 314. The magnet 314 is installed in the base shell 312. The base shell 312 has a generally cylindrical shape. In other embodiments, the base shell 312 has other shapes, for example, a prism having three sides, four sides, five sides, and so on.

Figure 3D:
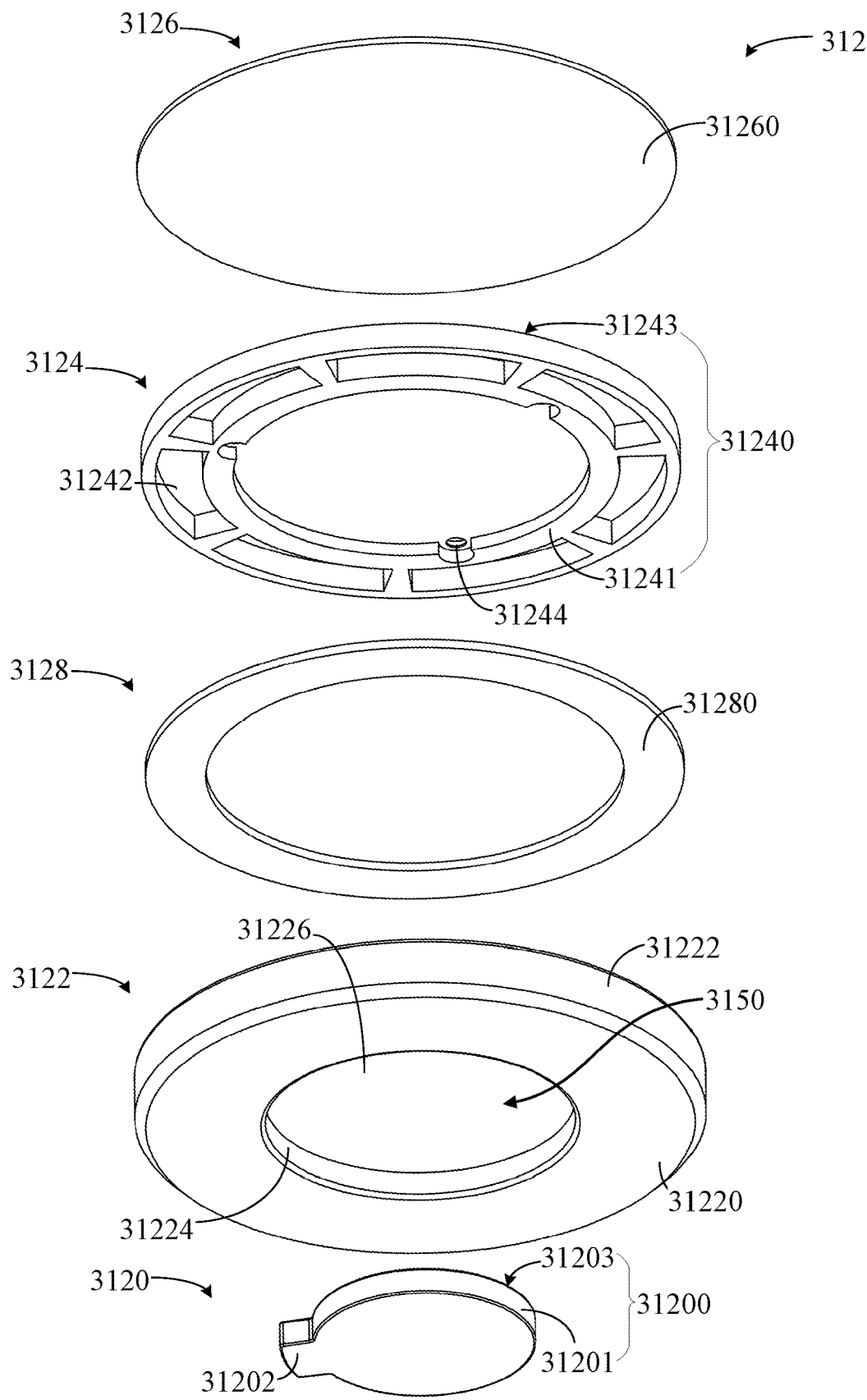
FIG. 3D shows an exploded perspective view according to an embodiment.

FIG. 3D schematically shows an exploded view of the base shell 312 according to an embodiment.

Figure 3E:
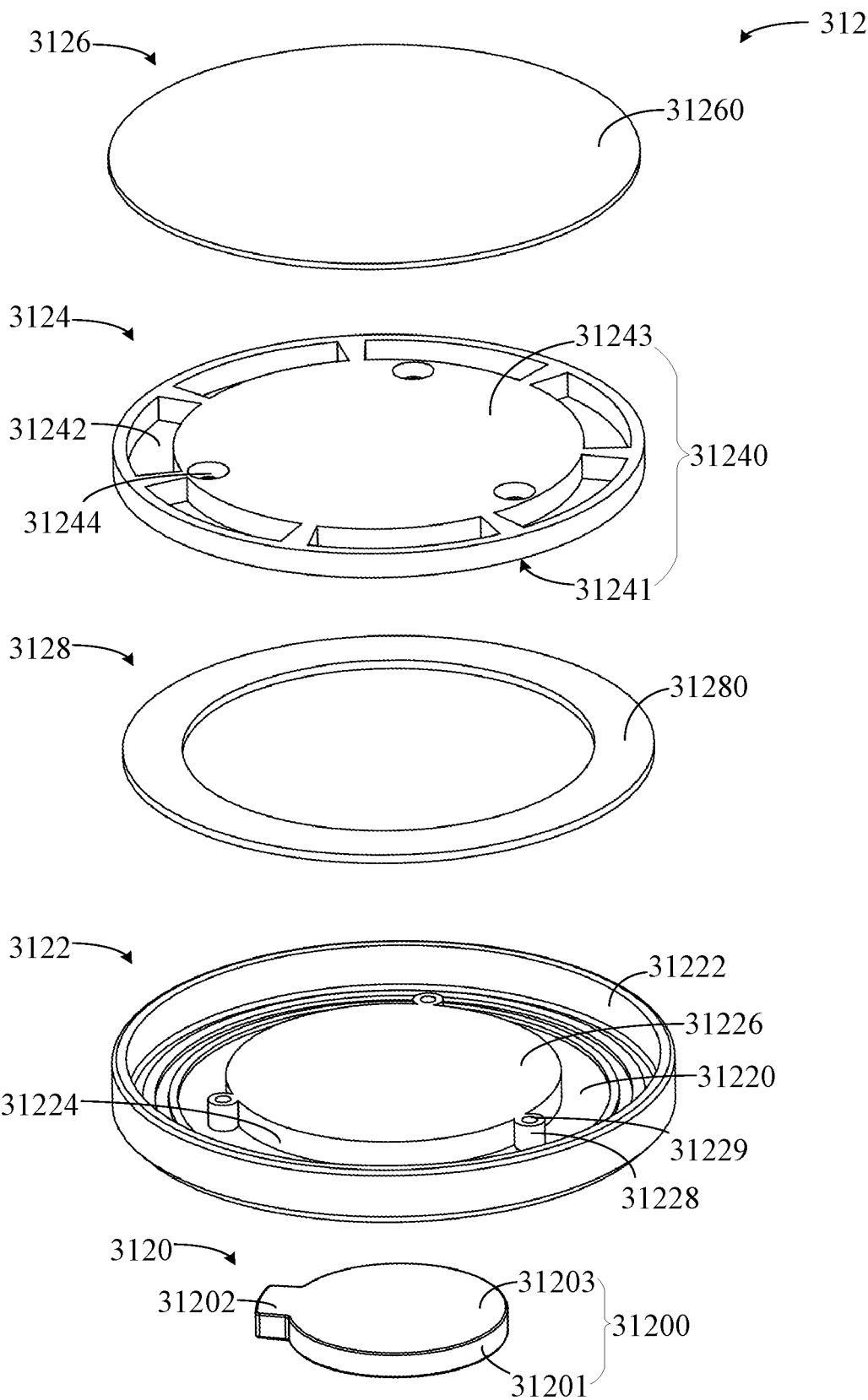
FIG. 3E shows an exploded perspective view according to an embodiment.

FIG. 3E schematically shows an exploded view of the base shell 312 according to an embodiment. The base shell 312 has a split structure including a first subshell component 3120, a second subshell component 3122, a third subshell component 3124, a fourth subshell component 3126, and a fifth subshell component 3128. The first subshell component 3120, the second subshell component 3122, the third subshell component 3124, the fourth subshell component 3126, and the fifth subshell component 3128 are assembled to form the base shell 312. In other embodiments, the base shell 312 is formed from fewer than five sub-components. In some embodiments, the base shell 312 is formed as a unitary structure.

Still referring to FIGS. 3D and 3E, the first subshell component 3120 includes a base part 31200 and a shaft seat 31202. The base part 31200 has a generally cylindrical shape, including a first side 31201 and a second side 31203. The shaft seat 31202 is connected to the first side 31201.

Still referring to FIGS. 3D and 3E, the second subshell component 3122 includes a ring-shaped bottom wall 31220, a ring outer wall 31222, a ring inner wall 31224, a top wall 31226, and a plurality of positioning columns 31228. Each of the positioning columns 31228 has a hole 31229. In some embodiments, the hole 31229 is threaded. The ring outer wall 31222 extends from the outer peripheral edge of the ring-shaped bottom wall 31220. The ring inner wall 31224 extends from the inner peripheral edge of the ring-shaped bottom wall 31220 to the top wall 31226. The ring inner wall 31224 surrounds an inner region 3150. The top wall 31226 extends radially between top edge portions of the ring inner wall 31224 to form an accommodating recess 3101 in the inner region 3150.

Still referring to FIGS. 3D and 3E, there are three positioning columns 31228. However, in other embodiments, fewer than three or more than three positioning columns 31228 are included. The positioning columns 31228 surround the ring inner wall 31224. The ring outer wall 31222 surrounds the positioning columns 31228. One end of each positioning column 31228 is proximal to the ring-shaped bottom wall 31220, and the other end is distal to the ring-shaped bottom wall 31220. The distal end of the positioning column 31228 is level with the top wall 31226.

Still referring to FIGS. 3D and 3E, the third subshell component 3124 includes a main body part 31240, a magnet groove portion 31242, and a plurality of positioning hole parts 31244. The main body parts 31240 has a generally cylindrical shape and includes a first end face 31241 and a second end face 31243. The magnet groove portion 31242 has a generally ring-shaped structure. The magnet groove portion 31242 includes a plurality of sections so that the groove portion has an intermittent ring structure. As shown in FIGS. 3D and 3E, the magnet groove portion 31242 includes seven sections. In other embodiments, the magnet groove portion 31242 has a continuous ring structure. Each section of the magnet groove portion 31242 runs through the first end face 31241 and the second end face 31243. In other embodiments, the magnet groove portion 31242 runs through only one or the other of the first end face 31241 and the second end face 31243. Each of the positioning hole parts 31244 corresponds to one hole 31229 in a corresponding positioning column 31228. The positioning hole parts 31244 run through the first end face 31241 and the second end face 31243.

Still referring to FIGS. 3D and 3E, the fourth subshell component 3126 includes a cover body 31260. The cover body 31260 has a generally thin plate shape such as a circular disk shape. In various embodiments, an outer surface of the cover body 31260 is made of a soft material such as at least one of leather, silicone, or sponge. When the base shell 312 is assembled, the cover body 31260 extends radially between a top edge portion of the ring inner wall 31224 and a top edge portion of the ring outer wall 31222 to enclose the magnet groove portion 31242.

Still referring to FIGS. 3D and 3E, the fifth subshell component 3128 includes a support piece 31280. The support piece 31280 has a generally thin plate shape such as a thin ring shape, like a washer. In various embodiments, the support piece 31280 is made of a ferromagnetic material, such as iron, nickel, cobalt, or the like. In other embodiments, the support piece 31280 is not made of a ferromagnetic material. For example, in some embodiments, the support piece 31280 is made of stainless steel, composite, or an engineering plastic. In still other embodiments, the support piece 31280 is omitted.

Figure 3F:
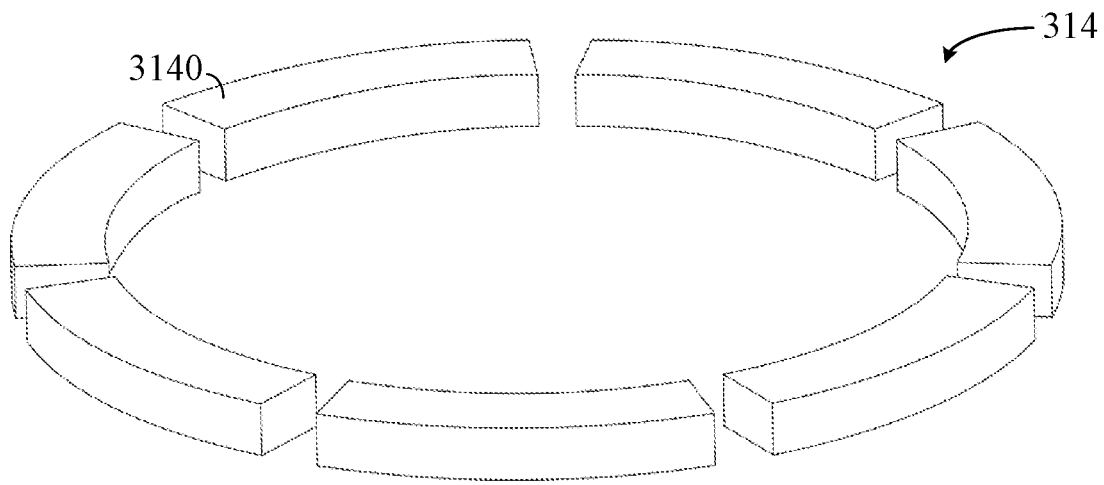
FIG. 3F shows a perspective view according to an embodiment.

FIG. 3F schematically shows a perspective view of the magnet 314 according to an embodiment. The magnet 314 has a generally ring-shaped structure. The magnet 314 includes at least one magnetic unit 3140. FIG. 3F shows the magnet 314 having seven magnetic units 3140. In other embodiments, a single magnetic unit 3140 forms a magnet 314 having a continuous ring shape. In still other embodiments, two or more magnetic units 3140 form a magnet 314 having an intermittent ring shape. The magnetic units 3140 are distributed uniformly in a circle. Each magnetic unit 3140 is an arc structure. In some embodiments, the magnetic units 3140 are fixed to the support piece 31280 by an adhesive such as a glue, epoxy, or the like.

Figure 3G:
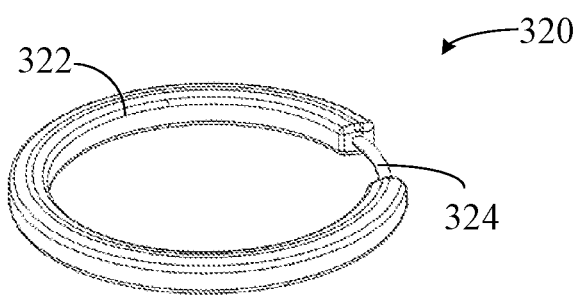
FIG. 3G shows a perspective view according to an embodiment.

FIG. 3G schematically shows a perspective view of the support assembly 320 according to an embodiment. The support assembly 320 includes a handle portion 322 and a rotatable part 324. The handle portion 322 and the rotatable part 324 are connected. The handle portion 322 has the shape of a hoop, or in other words, an incomplete ring. The rotatable part 324 is located at the break of the handle portion 322. According to various embodiments, the rotatable part 324 engages with the shaft seat 31202 of the first subshell component 3120 to form a joint portion 330 that connects the handle portion 322 to the base shell 312.

Figure 3H:
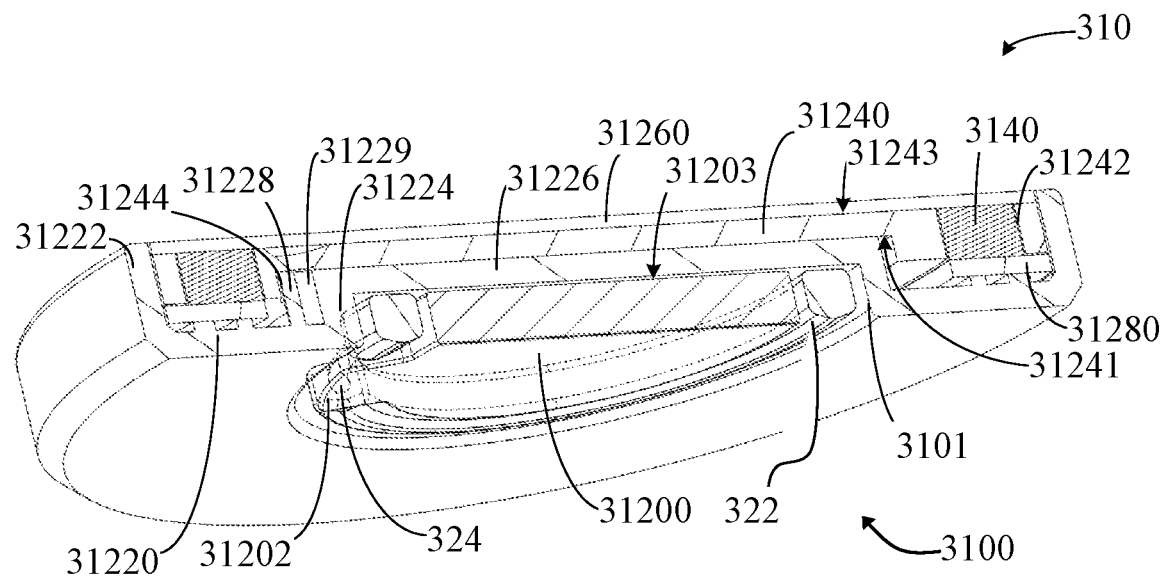
FIG. 3H shows a cross-sectional perspective view according to an embodiment.
Figure 3I:
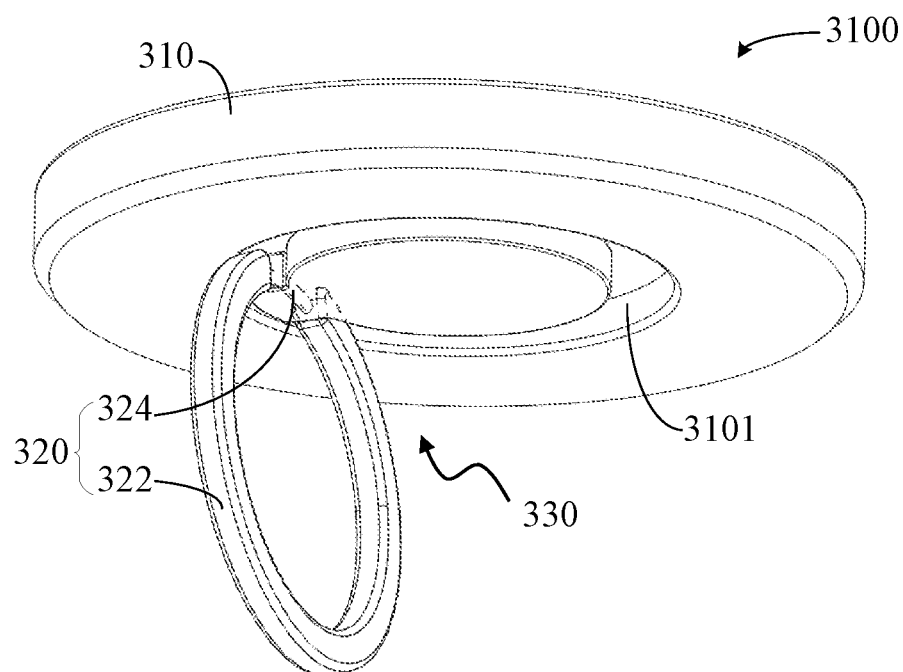
FIG. 3I shows a perspective view according to an embodiment.

FIG. 3H schematically shows a perspective cutaway view of an embodiment of the assembled mobile device holder 3100 with the handle portion 322 in the closed position z221.

FIG. 3I schematically shows a perspective view of an embodiment of the assembled mobile device holder 3100 with the handle portion 322 in the open position z222. To assemble the mobile device holder 3100, the rotatable part 324 is installed in the shaft seat 31202. The handle portion 322 may rotate around a secondary axis x100 of the rotatable part 324. The base part 31200 and the shaft seat 31202 are set in the inner region 3150, radially inside the ring inner wall 31224. The second side 31203 abuts the top wall 31226. The second side 31203 is fixed by an adhesive, such as glue or epoxy, to the top wall 31226. The base part 31200, the shaft seat 31202, the ring inner wall 31224, and the top wall 31226 form an accommodating recess 3101. The accommodating recess 3101 has a generally ring-shaped structure.

Still referring to FIGS. 3H and 3I, the support piece 31280 is installed radially inside the ring outer wall 31222 and radially outside the ring inner wall 31224. The support piece 31280 abuts the ring-shaped bottom wall 31220. In some embodiments, an adhesive such as glue or epoxy fixes the support piece 31280 to the ring-shaped bottom wall 31220. The main body part 31240 is installed radially inside the ring outer wall 31222 with portions of the first end face 31241 abutting the top wall 31226 and the support piece 31280. The second end face 31243 abuts an inside surface of the cover body 31260. Each of the positioning columns 31228 is aligned with its corresponding positioning hole part 31244. Threaded fasteners are threaded through the positioning hole parts 31244 and screwed into the holes 31229 in the positioning columns 31228. Each of the magnetic units 3140 is housed in a corresponding section of the magnet groove portion 31242 and fixed to the support piece 31280. The cover body 31260 covers the second end face 31243, the magnet groove portion 31242, the positioning hole parts 31244, and other structures. In some embodiments, the cover body 31260 is fixed by a layer of adhesive, such as glue or epoxy, to the main body part 31240.

In use, the cover body 31260 is attached to the mobile device 900. The magnet 314 attracts the magnetic part 914 in the mobile device 900. In some embodiments, the magnetic part 914 includes an electromagnetic induction coil of the mobile device 900. In various embodiments, the shape and size of the magnet 314 matches the shape and size of the magnetic part 914. In some embodiments, the magnetic part 914 includes a permanent magnet. By including a soft material on an outside surface of the cover body 31260, the mobile device holder 3100 can avoid scratching or otherwise marring the mobile device 900.

When hand support is required, the handle portion 322 rotates around the secondary axis x100 of the rotatable part 324 so that the handle portion 322 extends out of the accommodating recess 3101. A user can use his or her finger to pass through the handle portion 322 to facilitate grasping the mobile device 900.

When hand support is no longer required, or when the handle portion 322 needs to be collapsed, the handle portion 322 rotates around the secondary axis x100 of the rotatable part 324 so that the handle portion 322 folds into the accommodating recess 3101. Thus configured, the mobile device holder 3100 is smaller in volume, and because the accommodating recess 3101 has a shape and size that matches the handle portion 322, the handle portion 322 is not easy to unfold unintentionally, such as by accidentally bumping it.

In various embodiments, the support assembly 320 is replaced by other kinds of support components, for example, an accordion structure. Support components, according to various embodiments, include any structure that can be held by a user to easily grasp the mobile device 900.

In some embodiments, the base shell 312 integrates in a single structure the base part 31200, the shaft seat 31202, the support piece 31280, and the cover body 31260. In some embodiments, a metal insert injection molding process includes wrapping the base shell 312 around the support piece 31280. In various embodiments, the support piece 31280 is made of a metal and the base shell 312 is made of a polymer.

Figure 3J:
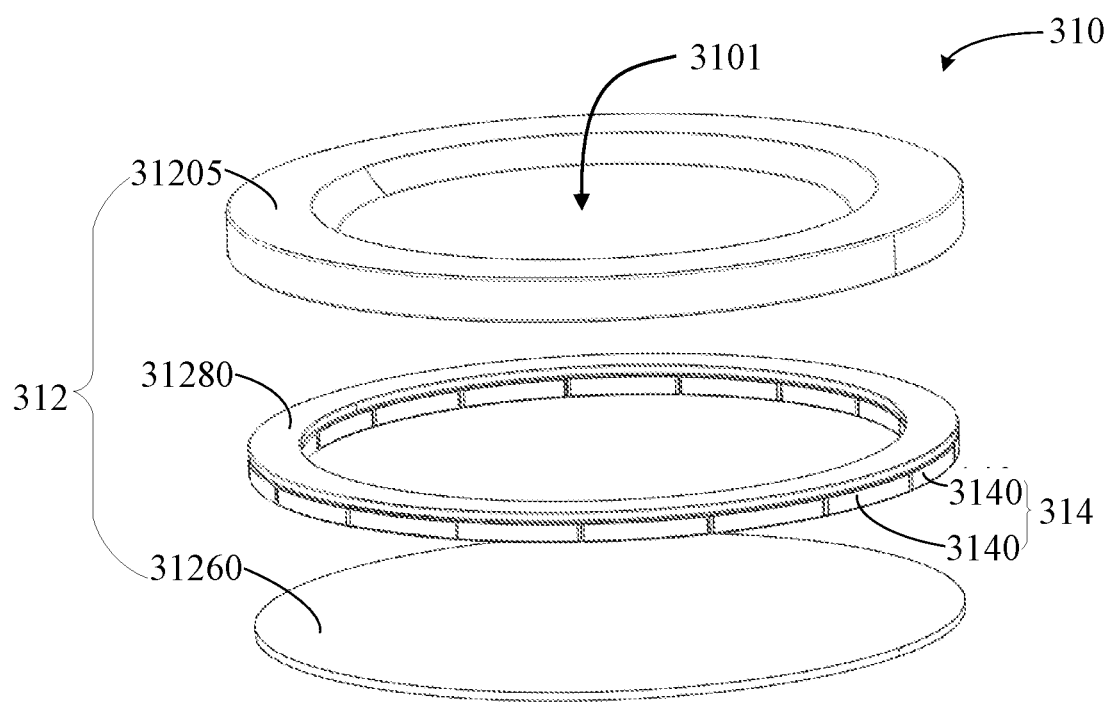
FIG. 3J shows a perspective view according to an embodiment.

FIG. 3J shows an exploded perspective view of the attachment assembly 310 according to an embodiment.

Figure 3K:
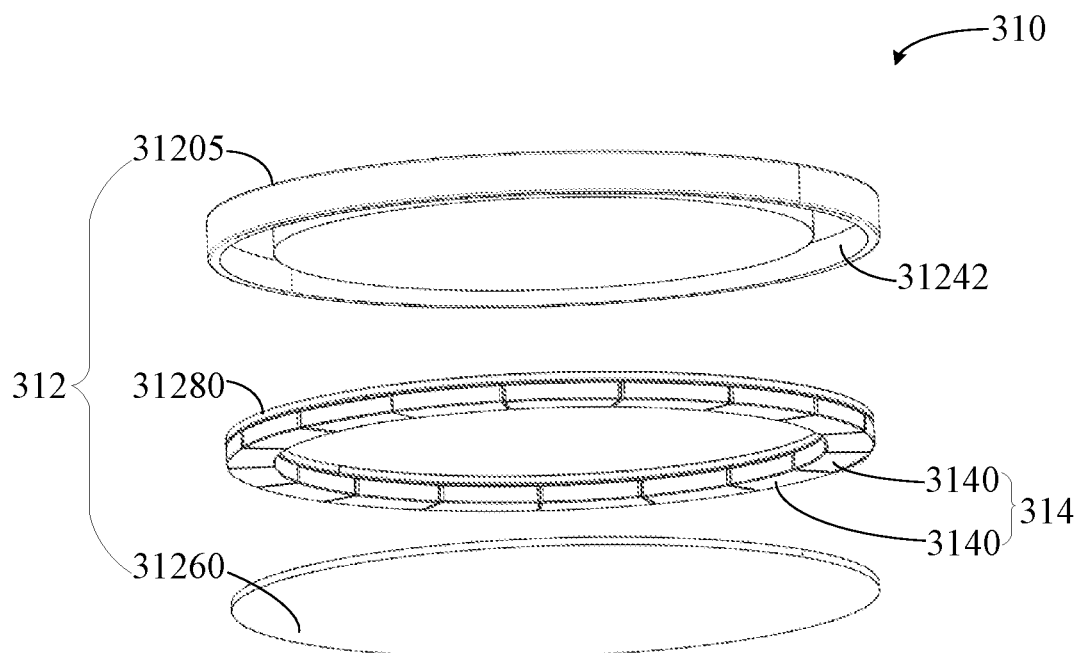
FIG. 3K shows a perspective view according to an embodiment.

FIG. 3K shows an exploded perspective view of the attachment assembly 310 according to an embodiment. The base shell 312 includes a base shell body 31205, the cover body 31260, and the support piece 31280. The base shell body 31205 is a generally flat cylinder, with the magnet groove portion 31242 on one end and the accommodating recess 3101 on the other end. The magnet groove portion 31242 has a generally circular shape. In some embodiments, the support piece 31280 is fixed to the base shell body 31205 by an adhesive, such as glue or epoxy. The magnet 314 includes a plurality of the magnetic units 3140, so that the magnet 314 has an intermittent ring structure. In other embodiments, the magnet 314 includes a single magnetic unit 3140 that forms a complete circle. In some embodiments, the support piece 31280 is omitted.

Figure 4A:
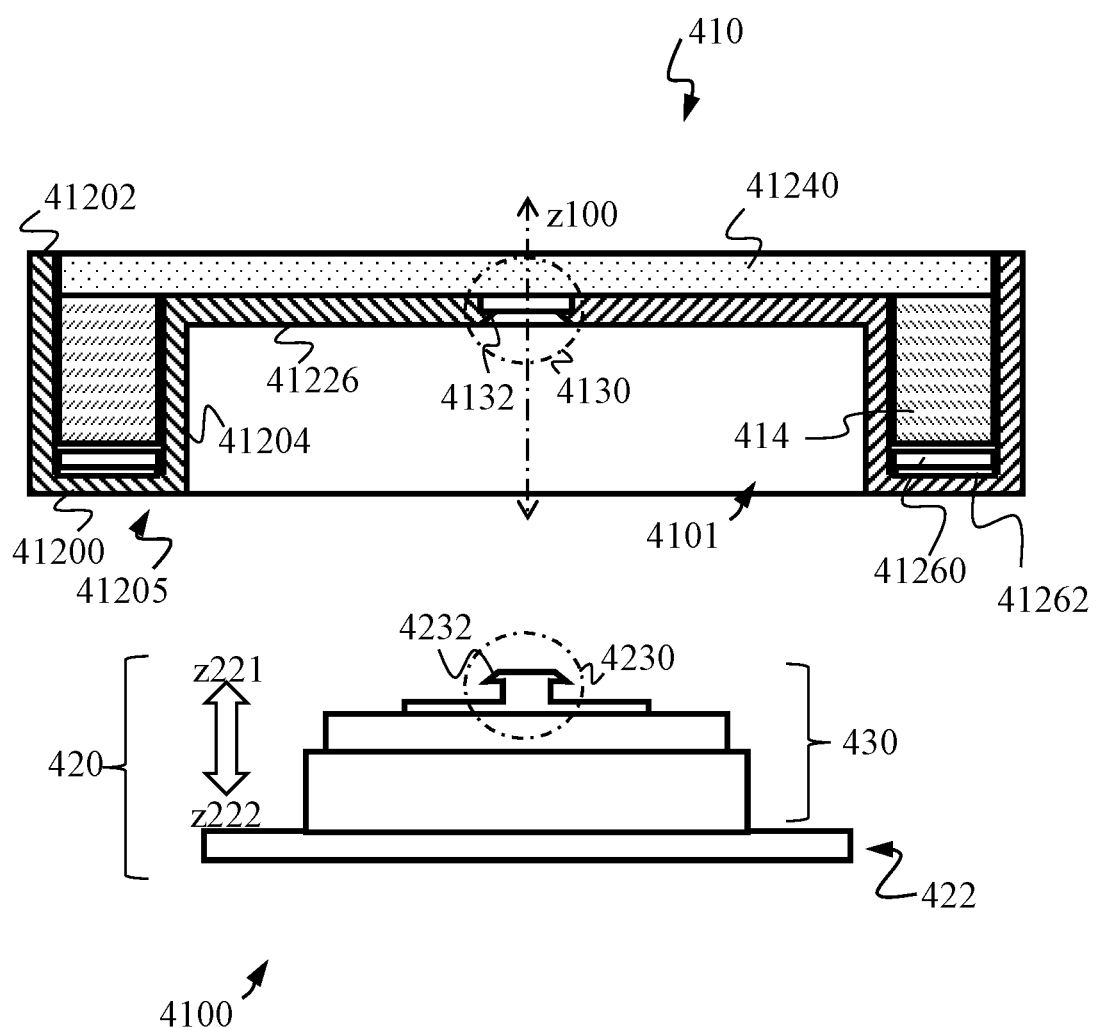
FIG. 4A shows an exploded cross-sectional side view according to an embodiment.

FIG. 4A schematically shows a cross-sectional side view of a mobile device holder 4100 according to an embodiment. The mobile device holder 4100 includes an attachment assembly 410 and a support assembly 420. The attachment assembly 410 includes a support connection part 4130 and the support assembly 420 includes a corresponding attachment connection part 4230. The support connection part 4130 and the attachment connection part 4230 mutually engage to connect the support assembly 420 to the attachment assembly 410.

Still referring to FIG. 4A, the attachment assembly 410 includes a base shell body 41205, a magnet 414, a support piece 41260, and a cover body 41240. The base shell body 41205 has a ring-shaped bottom wall 41200, an outer wall 41202, an inner wall 41204, and a top wall 41226. The top wall 41226 includes the support connection part 4130. The cover body 41240 has a generally thin, flat shape of a plate or a disk. In some embodiments, the support piece 41260 is fixed to the ring-shaped bottom wall 41200 by an adhesive 41262, such as glue or epoxy. In some embodiments, the support piece 41260 is omitted. The inner wall 41204 and the top wall 41226 form an accommodating recess 4101.

Still referring to FIG. 4A, the support assembly 420 includes a handle 422 and a joint 430. The joint 430 connects the handle 422 to the attachment assembly 410. In use, when the attachment assembly 410 is attached to the mobile device 900, the joint 430 permits the handle 422 to have a range of motion in relation to the mobile device 900. In a direction parallel to the primary axis z100, the joint 430 permits the handle 422 to be extended to an open position z222 and retracted to the closed position z221. In some embodiments, the joint 430 includes the attachment connection part 4230. In some embodiments, when the handle 422 is in the closed position z221, the handle 422 does not extend out of the accommodating recess 4101. In other embodiments, when the handle 422 is in the closed position z221, the handle 422 is flush with the ring-shaped bottom wall 41200. In still other embodiments, when the handle 422 is in the closed position z221, the handle 422 extends out of the accommodating recess 4101. According to various embodiments, the joint 430 operates by sliding, flexing, folding, twisting, rotating, or the like.

Figure 4B:
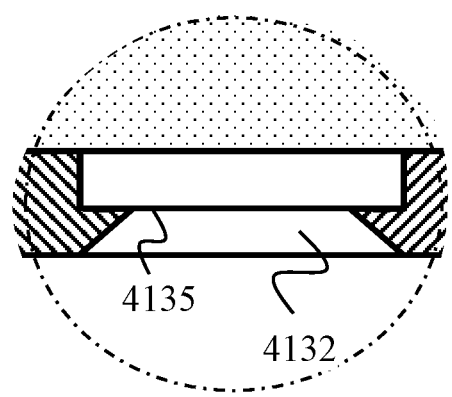
FIG. 4B shows a detailed cross-sectional side view according to an embodiment.

FIG. 4B shows a detailed cross-sectional side view of the support connection part 4130, according to an embodiment. The support connection part 4130 includes a detent socket 4132. The detent socket 4132 has a circular profile 4135.

Figure 4C:
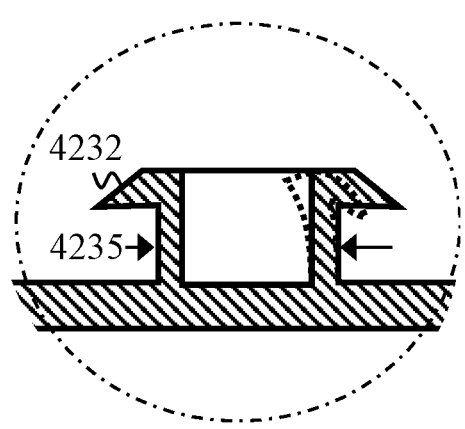
FIG. 4C shows a detailed cross-sectional side view according to an embodiment.

FIG. 4C shows a detailed cross-sectional side view of the attachment connection part 4230, according to an embodiment. The attachment connection part 4230 includes a detent clip 4232. The detent clip 4232 has a circular profile 4235. Inserting the detent clip 4232 into the detent socket 4132 connects the support assembly 420 to the attachment assembly 410. The circular profile 4135 of the detent socket 4132 and the corresponding circular profile 4235 of the detent clip 4232 permit the support assembly 420 to rotate in relation to the attachment assembly 410. The support assembly 420 rotates around the primary axis z100. Thus, according to some embodiments, the joint 430 includes the attachment connection part 4230 and the support connection part 4130.

Figure 5A:
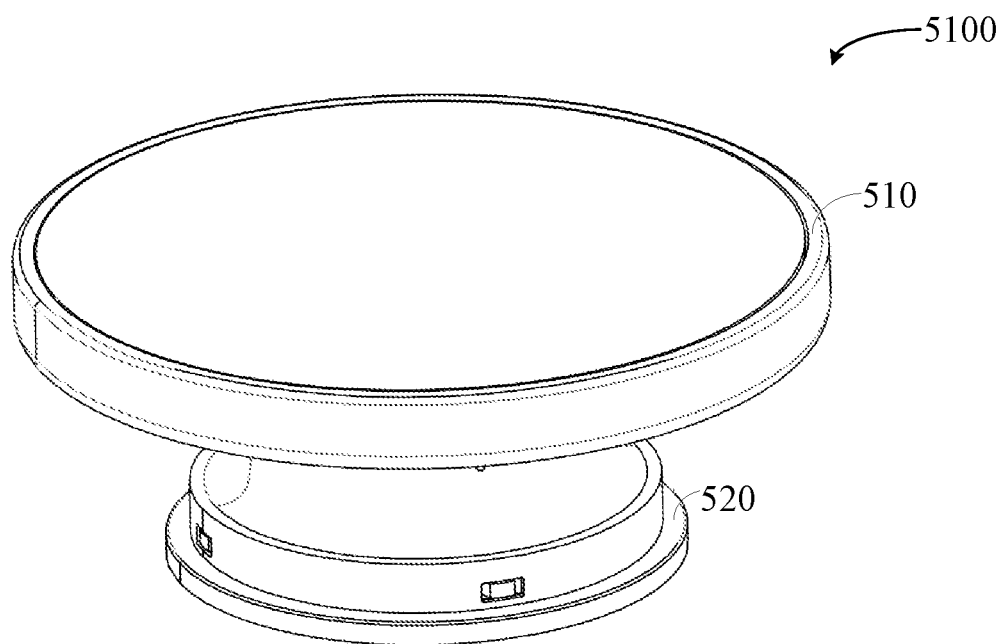
FIG. 5A shows a perspective view according to an embodiment.

FIG. 5A shows a perspective view of a mobile device holder 5100, according to an embodiment.

Figure 5B:
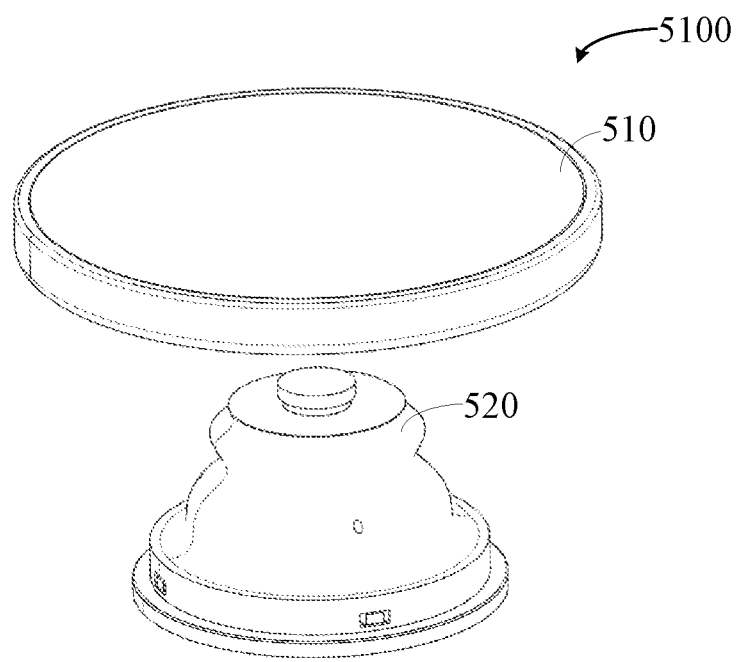
FIG. 5B shows an exploded perspective view according to an embodiment.

FIG. 5B shows an exploded perspective view of the mobile device holder 5100. The mobile device holder 5100 includes an attachment assembly 510 and a support assembly 520.

Figure 5C:
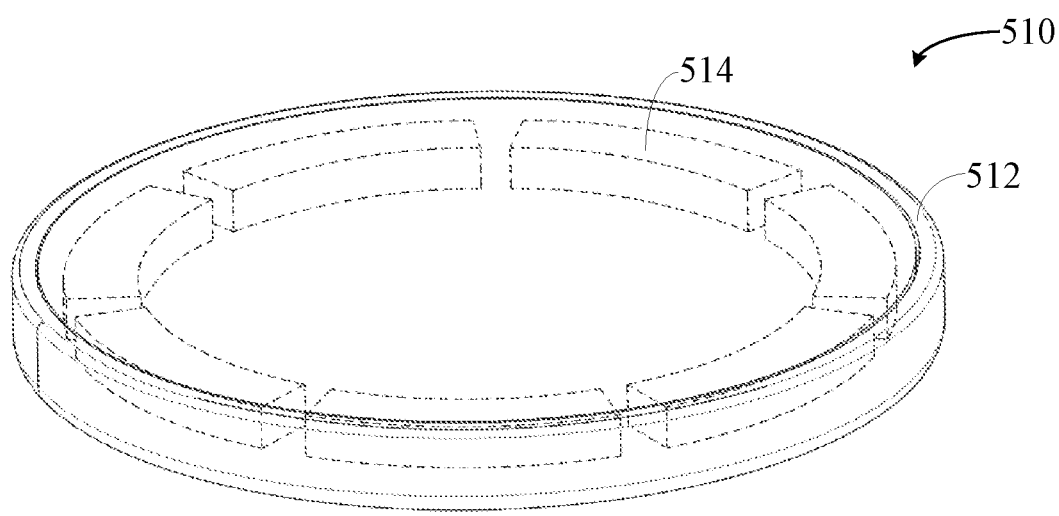
FIG. 5C shows a schematic perspective view according to an embodiment.

FIG. 5C shows a schematic perspective view of the attachment assembly 510, including a base shell 512 and a magnet 514 enclosed inside the base shell 512. The base shell 512 has a generally cylindrical shape. In other embodiments, the base shell 512 has other shapes, for example, a prism having three sides, four side, five sides, and so on.

Figure 5D:
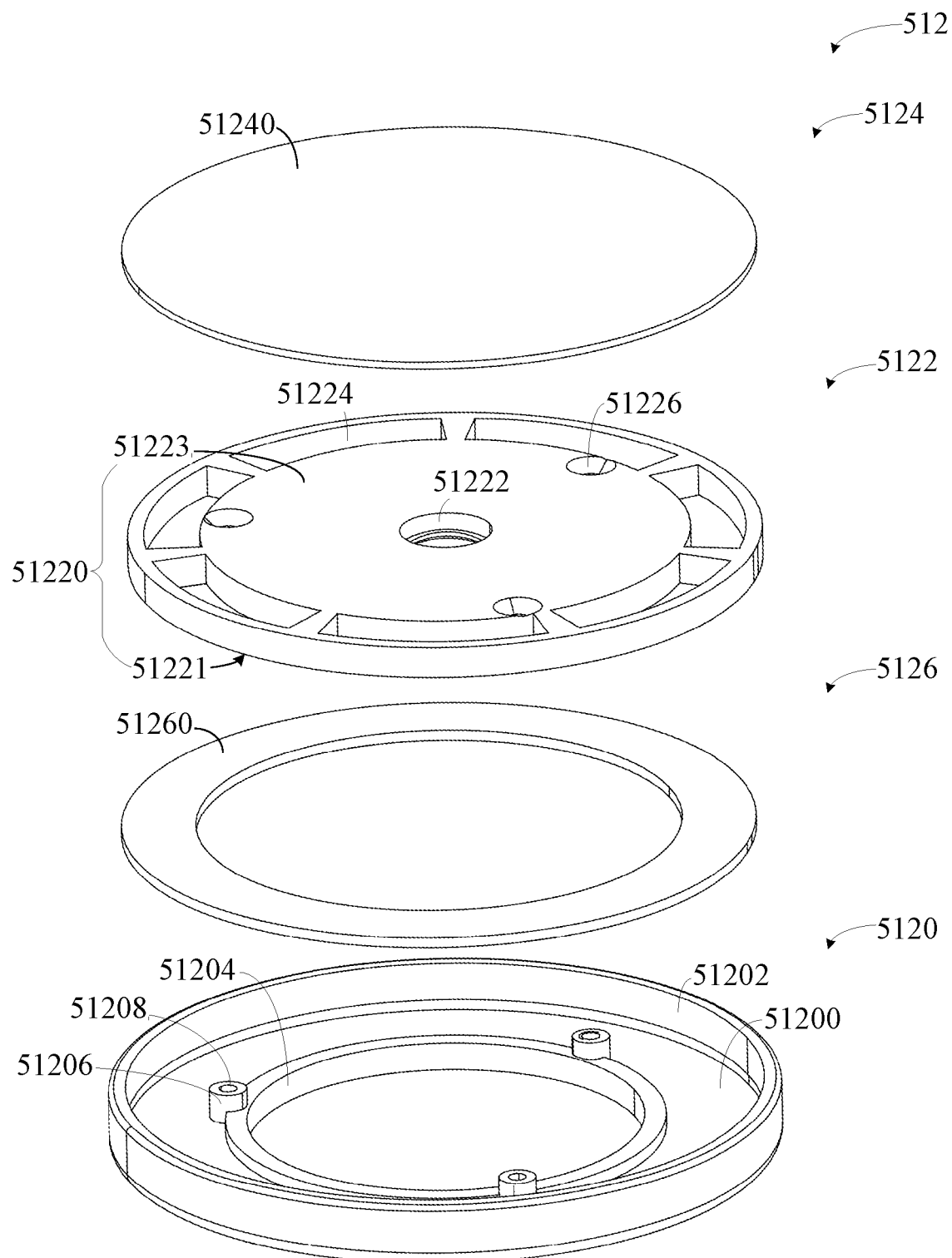
FIG. 5D shows an exploded perspective view according to an embodiment.

FIG. 5D shows an exploded perspective view of the base shell 512.

Figure 5E:
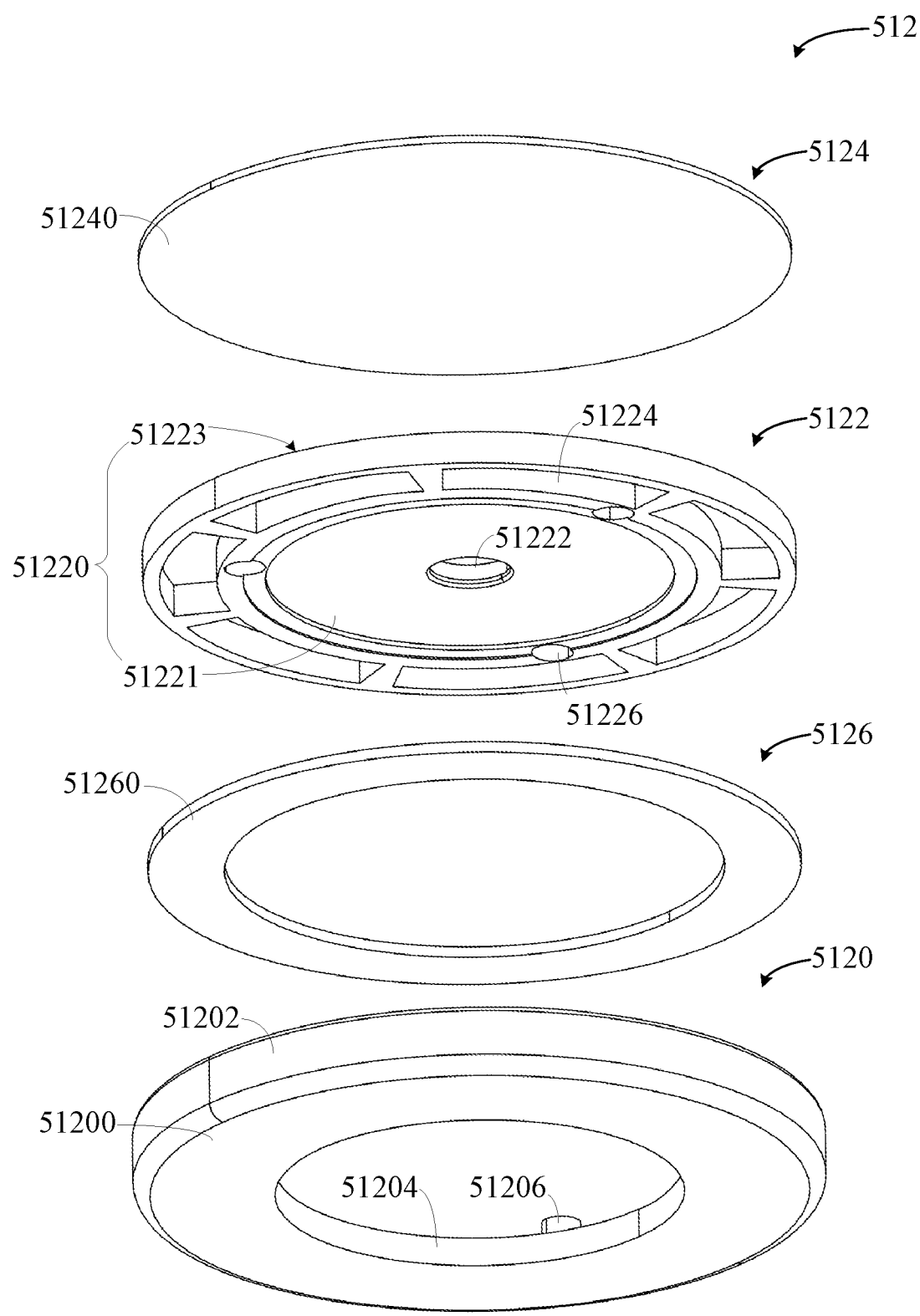
FIG. 5E shows an exploded perspective view according to an embodiment.

FIG. 5E shows an exploded perspective view of the base shell 512. The base shell 512 has a split structure including a first subshell component 5120, a second subshell component 5122, a third subshell component 5124, and a fourth subshell component 5126. The first subshell component 5120, the second subshell component 5122, the third subshell component 5124, and the fourth subshell component 5126 are assembled to form the base shell 512. In other embodiments, the base shell 512 is formed from fewer than four sub-components. In some embodiments, the base shell 512 is formed as a unitary structure.

Still referring to FIGS. 5D and 5E, the first subshell component 5120 includes a ring-shaped bottom wall 51200, a ring outer wall 51202, a ring inner wall 51204, and a plurality of positioning columns 51206. Each of the positioning columns 51206 includes a hole 51208 that extends height-wise parallel to the primary axis z100 into the positioning column 51206. In some embodiments, the hole 51208 is threaded. The embodiment shown in FIG. 5D includes three positioning columns 51206, but in other embodiments fewer than three or more than three positioning columns 51206 are provided. The ring-shaped bottom wall 51200 and the ring outer wall 51202 form a partial outer contour of the base shell 512.

The ring outer wall 51202 surrounds the ring inner wall 51204. The positioning columns 51206 are set between the ring outer wall 51202 and the ring inner wall 51204. One end of each of the positioning columns 51206 coincides with the ring-shaped bottom wall 51200. The other end of each of the positioning columns 51206 is distal from the ring-shaped bottom wall 51200.

Still referring to FIGS. 5D and 5E, the second subshell component 5122 includes a main body part 51220, a first snap part 51222, a magnet groove portion 51224, and a plurality of positioning hole parts 51226. The main body part 51220 has a generally flat cylindrical structure. The main body part 51220 includes a first end face 51221, the first snap part 51222, and a second end face 51223. Each of the positioning hole parts 51226 aligns with a corresponding positioning column 51206 in the first subshell component 5120, so that a screw inserted through the positioning hole part 51226 can be fastened by screwing into the hole 51208 of the positioning column 51206. The first snap part 51222 is set at the center of the main body part 51220. The first snap part 51222 has a step hole structure. A smaller-diameter section of the step hole structure is proximal to the first end face 51221 and a larger-diameter section of the step hole structure is proximal to the second end face 51223.

Still referring to FIGS. 5D and 5E, the main body part 51220 includes a magnet groove portion 51224 having a plurality of sections. The embodiment shown in FIGS. 5D and 5E has a magnet groove portion 51224 including seven sections. The sections of the magnet groove portion 51224 form an intermittent ring structure. In other embodiments, the magnet groove portion 51224 has a continuous ring structure. Each section of the magnet groove portion 51224 runs through the first end face 51221 and the second end face 51223. In other embodiments, the magnet groove portion 51224 runs through only one or the other of the first end face 51221 and the second end face 51223. Each of the positioning hole parts 51226 corresponds to one hole 51208 in one of the positioning columns 51206. The positioning hole parts 51226 run through the first end face 51221 and the second end face 51223.

Still referring to FIGS. 5D and 5E, the third subshell component 5124 includes a cover body 51240. The cover body 51240 has a generally thin plate shape such as a circular disk shape. In various embodiments, an outer surface of the cover body 51240 is made of a soft material such as at least one of leather, silicone, or sponge. When the base shell 512 is assembled, the cover body 51240 extends radially between a top edge portion of the ring inner wall 51204 and the ring outer wall 51202 to enclose the magnet groove portion 51224.

Still referring to FIGS. 5D and 5E, the fourth subshell component 5126 includes a support piece 51260. The support piece 51260 has a generally thin plate shape such as a thing ring shape, like a washer. In various embodiments, the support piece 51260 is made of a ferromagnetic material, such as iron, nickel, cobalt, or the like. In other embodiments, the support piece 51260 is not made of a ferromagnetic material. For example, in some embodiments, the support piece 51260 is made of stainless steel, composite, or an engineering plastic. In still other embodiments, the support piece 51260 is omitted.

Figure 5F:
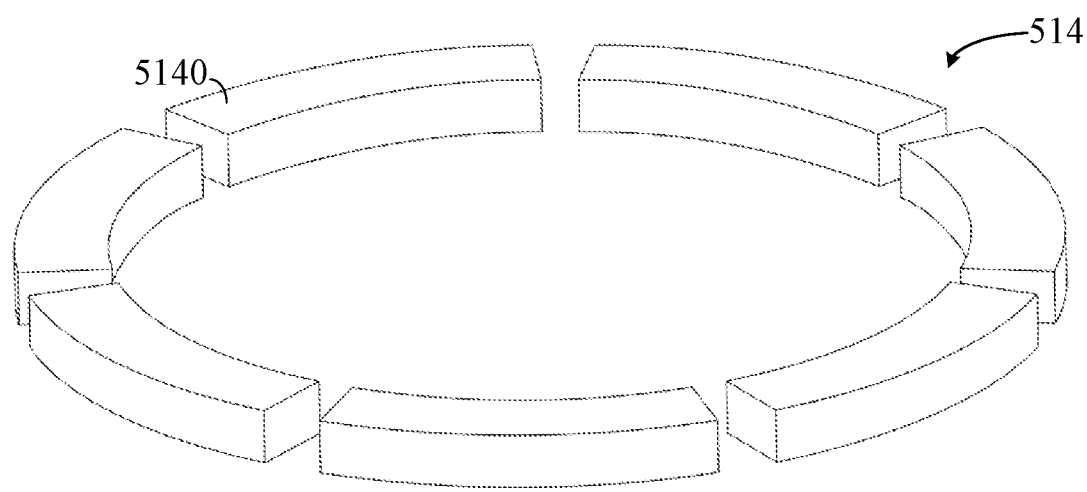
FIG. 5F shows a perspective view according to an embodiment.

FIG. 5F shows a perspective view of a magnet 514, according to an embodiment. The magnet 514 includes a plurality of magnetic units 5140. The magnet 514 has a generally ring-shaped structure. The magnet 514 includes at least one magnetic unit 5140. FIG. 5F shows the magnet 514 having seven magnetic units 5140. In other embodiments, a single magnetic unit 5140 forms a magnet 514 having a continuous ring shape. In still other embodiments, two or more magnetic units 5140 form a magnet 514 having an intermittent ring shape. The magnetic units 5140 are distributed uniformly in a circle. Each magnetic unit 5140 is an arc structure. In some embodiments, the magnetic units 5140 are fixed to the support piece 51260 by an adhesive such as a glue, epoxy, or the like.

Figure 5G:
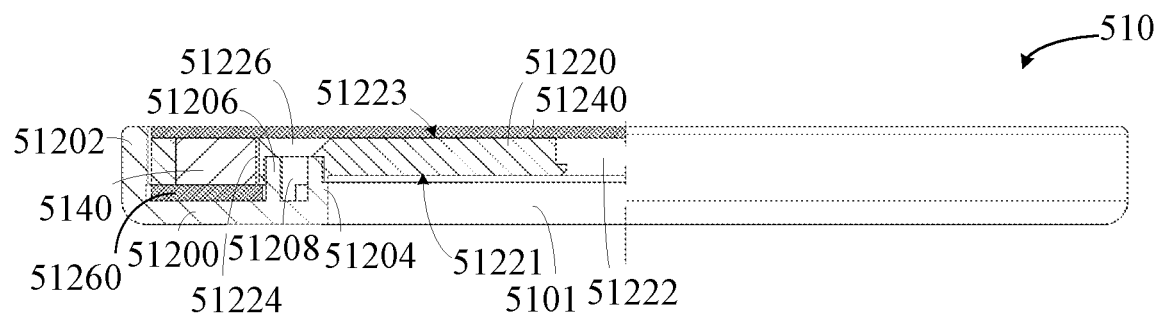
FIG. 5G shows a partial cutaway side view according to an embodiment.

FIG. 5G shows a partial cutaway side view of the attachment assembly 510, including aspects of the first subshell component 5120, the second subshell component 5122, the third subshell component 5124, and the fourth subshell component 5126. The first subshell component 5120 includes the ring-shaped bottom wall 51200, the ring outer wall 51202, the ring inner wall 51204, and the positioning columns 51206. The magnet groove portion 51224 includes a concave region formed between the ring-shaped bottom wall 51200, the ring outer wall 51202, and the ring inner wall 51204. The support piece 51260 rests against the ring-shaped bottom wall 51200. The main body part 51220 holds the magnetic unit 5140 in the magnet groove portion 51224, and the magnetic unit 5140 rests against the support piece 51260. The cover body 51240 rests against the magnetic unit 5140 and the second end face 51223 of the main body part 51220. The ring inner wall 51204 and the first end face 51221 of the main body part 51220 form the concave accommodating recess 5101.

Still referring to FIG. 5G, to assemble the mobile device holder 5100, the support piece 51260 is installed radially inside the ring outer wall 51202 and radially outside the ring inner wall 51204. Portions of the first end face 51221 of the main body part 51220 are brought into contact with the circumference of the ring inner wall 51204 and the support piece 51260. The first end face 51221 and the ring inner wall 51204 jointly form the accommodating recess 5101. The first end face 51221 includes the first snap part 51222. Each of the positioning columns 51206 is aligned with its corresponding positioning hole part 51226. Threaded fasteners are threaded through the positioning hole parts 51226 and screwed into the holes 51208 in the positioning columns 51206. Each of the magnetic units 5140 is housed in a corresponding section of the magnet groove portion 51224 and fixed to the support piece 51260. The cover body 51240 covers the second end face 51223, the magnet groove portion 51224, the positioning hole parts 51226, and other structures. In some embodiments, the cover body 51240 is fixed by a layer of adhesive, such as glue or epoxy, to the main body part 51220.

Figure 5H:
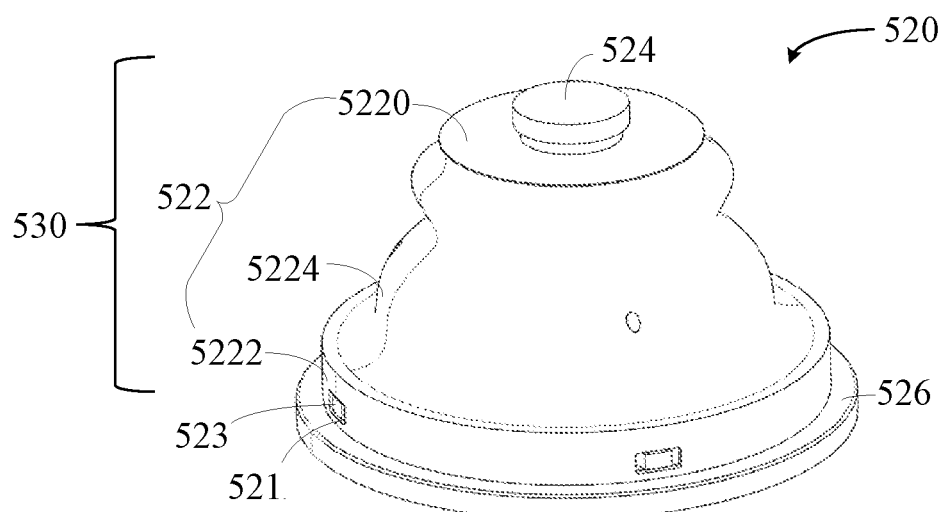
FIG. 5H shows a perspective view according to an embodiment.

FIG. 5H shows a perspective view of the support assembly 520, according to an embodiment. The support assembly 520 includes a flange part 526 and a joint portion 530. A plurality of first buckle parts 521 engages with a corresponding plurality of second buckle parts 523 to hold the flange part 526 to the joint portion 530. The joint portion 530 movably connects the flange part 526 to the attachment assembly 510. The joint portion 530 includes an accordion part 522 and a second snap part 524. The accordion part 522 includes a first end 5220, a second end 5222, and a foldable segment 5224. The second snap part 524 has a profile suitable for engaging with the first snap part 51222 of the attachment assembly 510. The first end 5220 has a diameter smaller than the second end 5222. The foldable segment 5224 has a generally horn-like shape. A smaller end of the foldable segment 5224 is connected to the first end 5220, and a larger end of the foldable segment 5224 is connected to the second end 5222. The second snap part 524 connects to the first end 5220.

Still referring to FIG. 5H, the snap part 524 has a step column structure. A smaller-diameter section of the step column structure is proximal to the first end 5220 and a larger-diameter section of the step column structure extends from the smaller-diameter section away from the first end 5220. The flange part 526 connects to the second end 5222 by the first buckle parts 521 and second buckle parts 523. The flange part extends radially beyond the second end 5222.

Figure 5I:
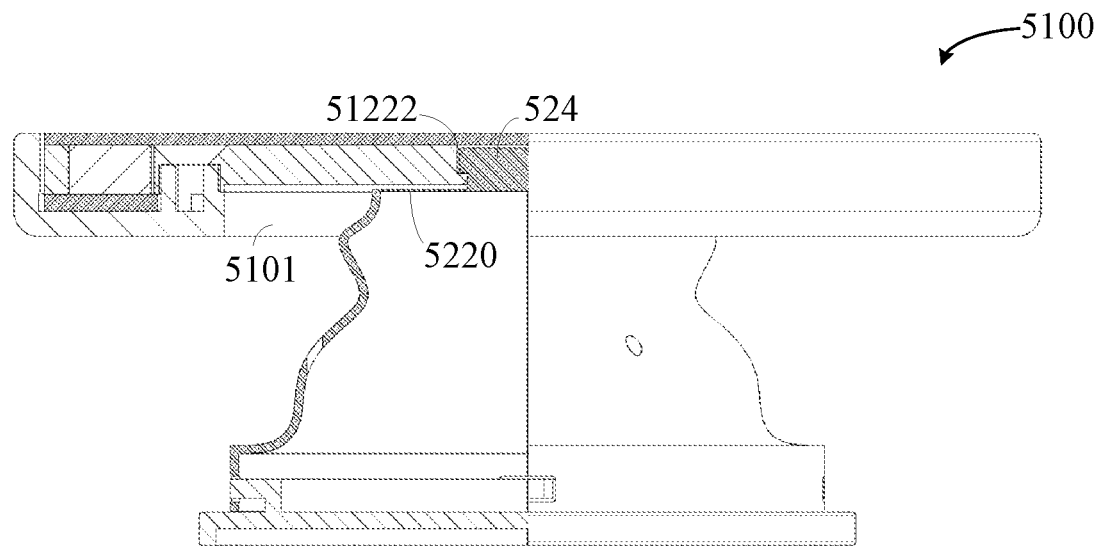
FIG. 5I shows a partial cutaway side view according to an embodiment.

FIG. 5I shows a partial cutaway side view of the mobile device holder 5100, according to an embodiment. The support assembly 520 is a split structure, including a first support component and a second support component. The second support component is installed in the first support component. The first support component includes the second snap part 524, the first end 5220, the second end 5222, the foldable segment 5224, and the first buckle parts 521. The first buckle part 521 is connected to one end of the first end 5220 away from the foldable segment 5224. The second support component includes the flange part 526 and the second buckle parts 523. The second buckle parts 523 connect to the flange part 526 via the first buckle parts 521. In some embodiments, the first buckle parts 521 include a plurality of openings distributed evenly around a circumference of the second end 5222. In some embodiments, the second buckle parts 523 include a plurality of L-shaped tabs distributed evenly around a circumference of the flange part 526. According to an embodiment, each of four second buckle parts 523 is accommodated in a corresponding one of four first buckle parts 521. In other embodiments, fewer than four or more than four of the first buckle parts 521 and the second buckle parts 523 are used. In other embodiments, the support assembly 520 is an all-in-one structure.

Still referring to FIG. 5I, to assemble the mobile device holder 5100, the first end 5220 is installed in the accommodating recess 5101 by engaging the first snap part 51222 with the second snap part 524 and engaging the first buckle parts 521 with the second buckle parts 523.

Figure 5J:
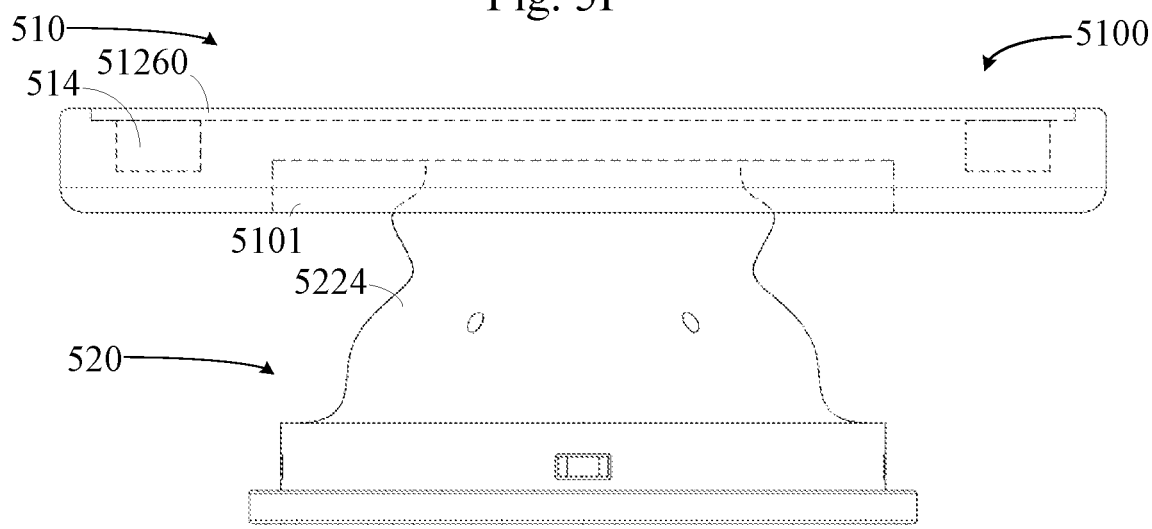
FIG. 5J shows a schematic side view according to an embodiment.

FIG. 5J schematically shows the mobile device holder 5100. The joint portion 30 includes the foldable segment 5224.

Figure 5K:
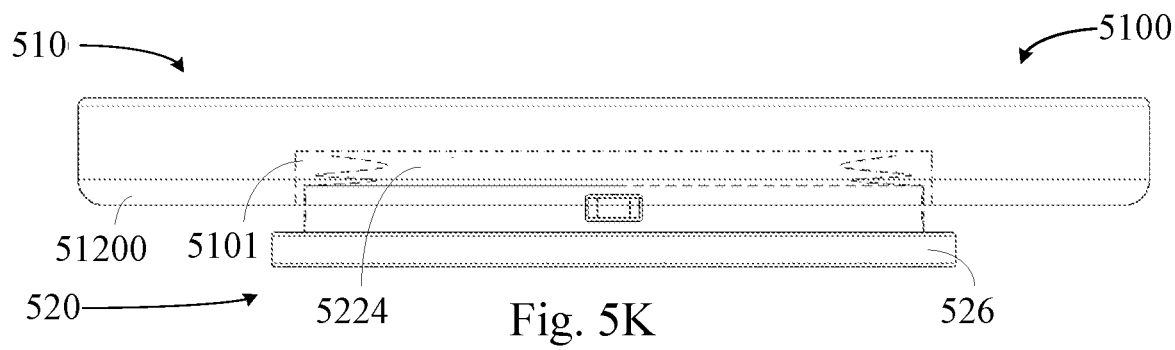
FIG. 5K shows a schematic side view according to an embodiment.

FIG. 5K shows the mobile device holder 5100 with the support assembly 520 stowed in the closed position z221. In FIG. 5K, the foldable segment 5224 of the accordion part 522 of the support assembly 520 has been folded into a compact configuration so that the accordion part 522 does not extend out of the accommodating recess 5101.

In use, the cover body 51240 is attached to the mobile device 900. The magnet 514 attracts the magnetic part 914 in the mobile device 900. In some embodiments, the magnetic part 914 includes an electromagnetic induction coil of the mobile device 900. In various embodiments, the shape and size of the magnet 514 matches the shape and size of the magnetic part 914. In some embodiments, the magnetic part 914 includes a permanent magnet. By including a soft material on an outside surface of the cover body 51240, the mobile device holder 5100 can avoid scratching or otherwise marring the mobile device 900.

When hand support is required, the accordion part 522 unfolds so that the flange part 526 extends out of the accommodating recess 5101. A user can use his or her fingers around the accordion part 522 and the flange part 526 to facilitate grasping the mobile device 900.

When hand support is no longer required, or when the support assembly 520 needs to be collapsed, the accordion part 522 folds into the accommodating recess 5101. Thus configured, the mobile device holder 5100 is smaller in volume, and because the accommodating recess 5101 has a shape and size that matches the support assembly 520, the support assembly 520 is not easy to unfold unintentionally, such as by accidentally bumping it. In some embodiments, the diameter of the flange part 526 is greater than a diameter of the accommodating recess 5101. In some embodiments, the flange part 526 remains offset from the ring-shaped bottom wall 51200 when the foldable segment 5224 is collapsed to make it easier for a user to pry the flange part 526 away from the ring-shaped bottom wall 51200 to expand the foldable segment 5224.

Figure 5L:
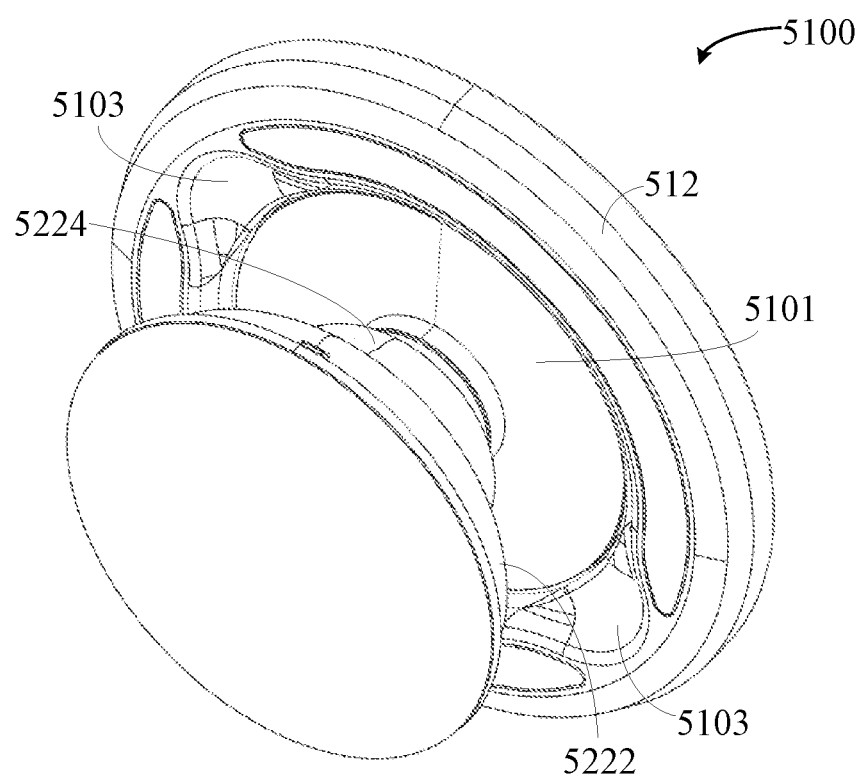
FIG. 5L shows a perspective view according to an embodiment.

FIG. 5L shows the mobile device holder 5100 including indentations 5103 that connect to the accommodating recess 5101 through the ring outer wall 51202. FIG. 5L shows two of the indentations 5103, but in other embodiments there are fewer than two of the indentations 5103 or more than two of the indentations 5103. In various embodiments, a plurality of the indentations 5103 are distributed evenly around accommodating recess 5101. For example, two indentations 5103 may be symmetrically set on opposite sides of the accommodating recess 5101. When the support assembly 520 is in the closed position z221, the collapsed accordion part 522 occupies the accommodating recess 5101 and each of the indentations 5103 exposes a surface of the flange part 526 so that a user can more easily pry the flange part 526 away from the ring-shaped bottom wall 51200 to expand the foldable segment 5224.

Figure 5M:
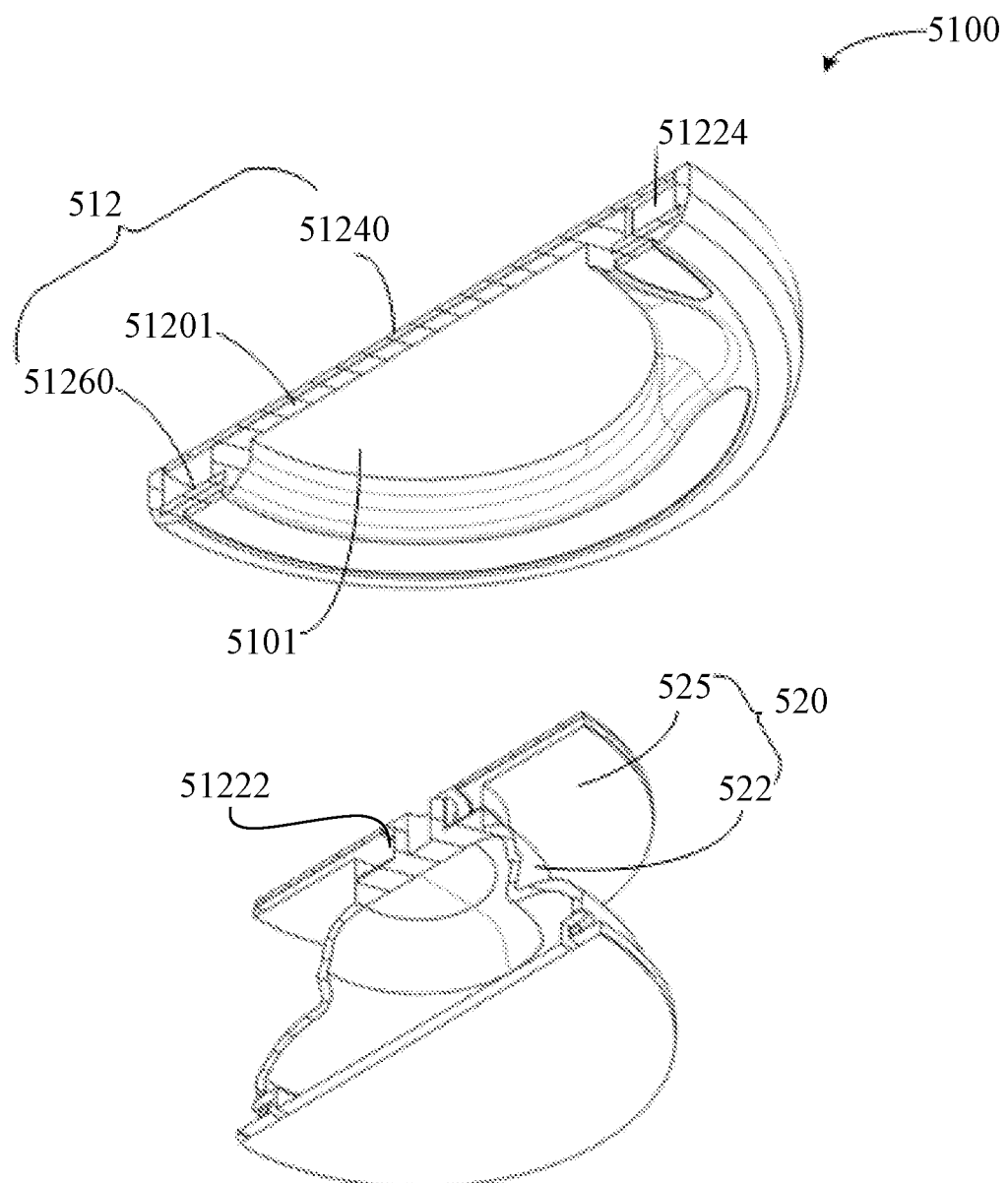
FIG. 5M shows an exploded cross-sectional perspective view according to an embodiment.

FIG. 5M shows an exploded cross-sectional perspective view of the mobile device holder 5100 according to an embodiment, including aspects of the base shell 512 and the support assembly 520. The base shell 512 includes a base shell body 51201 in which the magnet groove portion 51224 is formed. The base shell body 51201 forms the inner and outer walls of the magnet groove portion 51224, the support piece 51260 forms the bottom wall of the magnet groove portion 51224, and the cover body 51240 forms the top wall of the magnet groove portion 51224. The accommodating recess 5101 is formed radially inward of the magnet groove portion 51224. The support assembly 520 includes the accordion part 522 and a bonding part 525. The bonding part 525 includes a plate or disk-shaped flange with a first snap part 51222 in the middle. In some embodiments, the bonding part 525 is fixed to the accommodating recess 5101 by an adhesive, such as glue or epoxy, on a side of the bonding part 525 opposite the first snap part. The accordion part 522 and the flange part 526 can be attached to the bonding part 525 by engaging the second snap part 524 with the first snap part 51222.

Still referring to FIG. 5M, the base shell body 51201 is a substantially flat cylindrical structure. In some embodiments, a metal insert injection molding process includes wrapping the base shell body 51201 around the support piece 51260. Thus, in some embodiments, it is possible to simplify the assembly process by omitting the positioning columns 51206, the positioning hole parts 51226, and threaded fasteners.

Figure 5N:
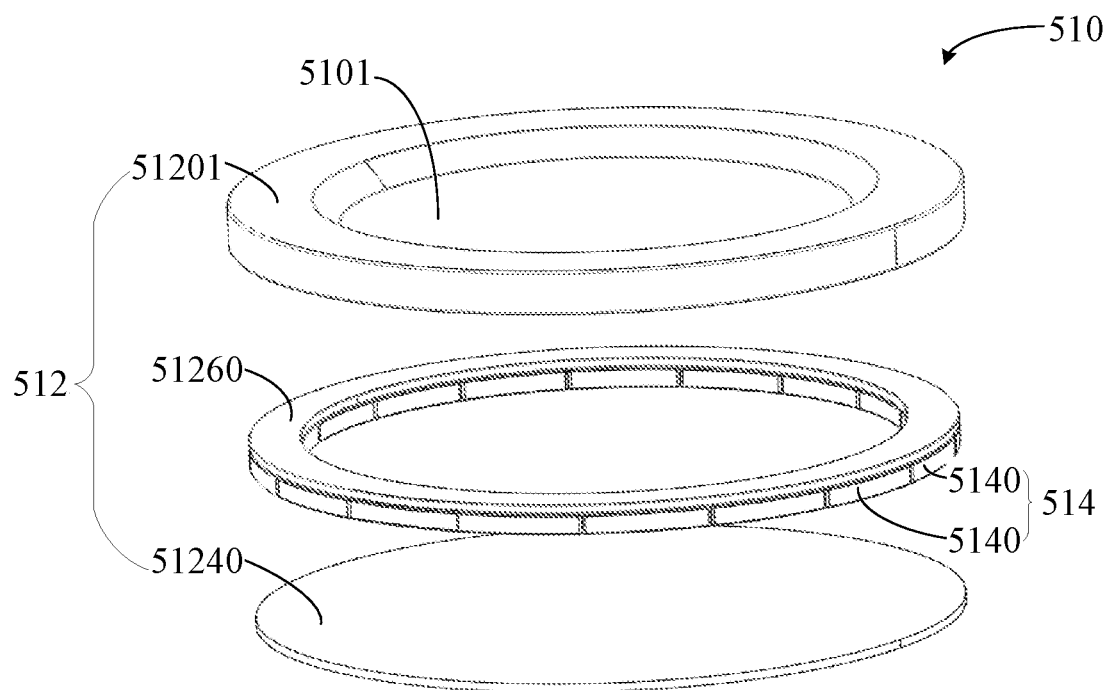
FIG. 5N shows an exploded perspective view according to an embodiment.

FIG. 5N shows an exploded perspective view of the attachment assembly 510 according to an embodiment.

Figure 5O:
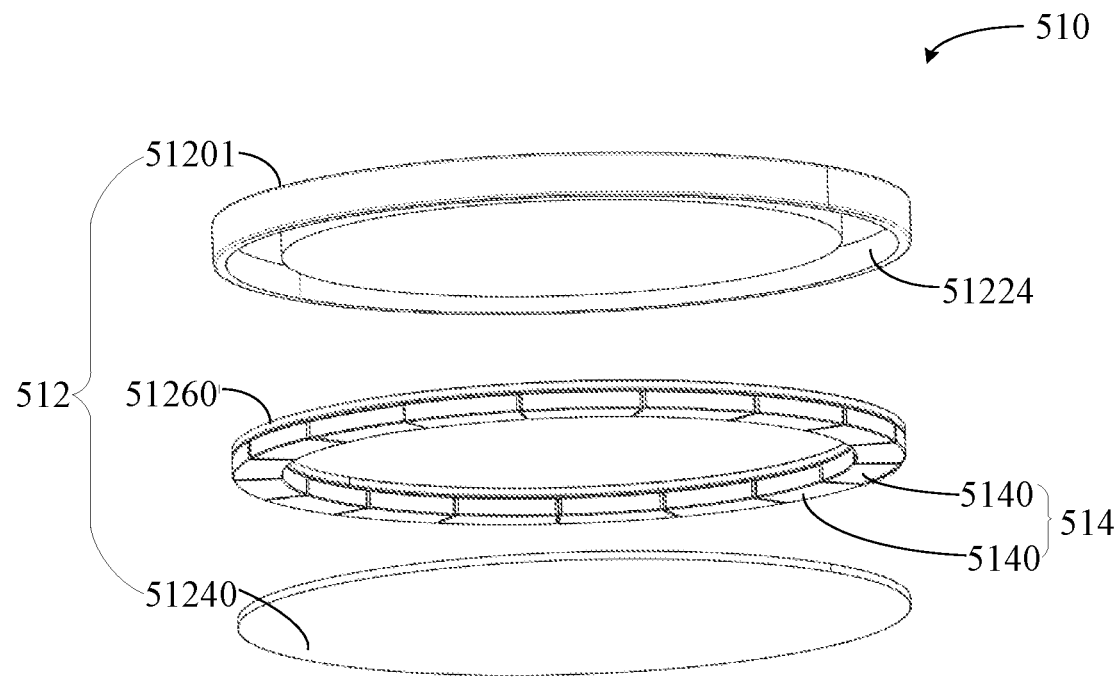
FIG. 5O shows an exploded perspective view according to an embodiment.

FIG. 5O shows an exploded view of the attachment assembly 510 according to an embodiment. The attachment assembly 510 includes the base shell 512 and the magnet 514. The base shell 512 includes the base shell body 51201 and the cover body 51240. The magnet groove portion 51224 is formed in the base shell body 51201. The magnet 514 includes a plurality of the magnetic units 5140 and the support piece 51260. The magnet 514 fits inside the base shell 512 with the support piece 51260 inside the magnet groove portion 51224 on a side facing away from the cover body 51240. The cover body 51240 abuts the magnetic units 5140 on the side opposite the support piece 51260.

Still referring to FIG. 5O, in some embodiments the magnet 514 is magnetically attracted to the support piece 51260 and the support piece 51260 is contained in the magnet groove portion 51224. In some embodiments the support piece 51260 is fixed in the magnet groove portion 51224 by an adhesive, such as glue or epoxy. The magnet 514 includes a plurality of the magnetic units 5140. Each of the magnetic units 5140 has an arc structure and is fixed to the support piece 51260. In some embodiments, each pair of neighboring magnetic units 5140 contact each other. In some embodiments, the support piece 51260 is omitted and the magnetic units 5140 are fixed directly to the base shell body 51201 by an adhesive, such as glue or epoxy.

Figure 6:
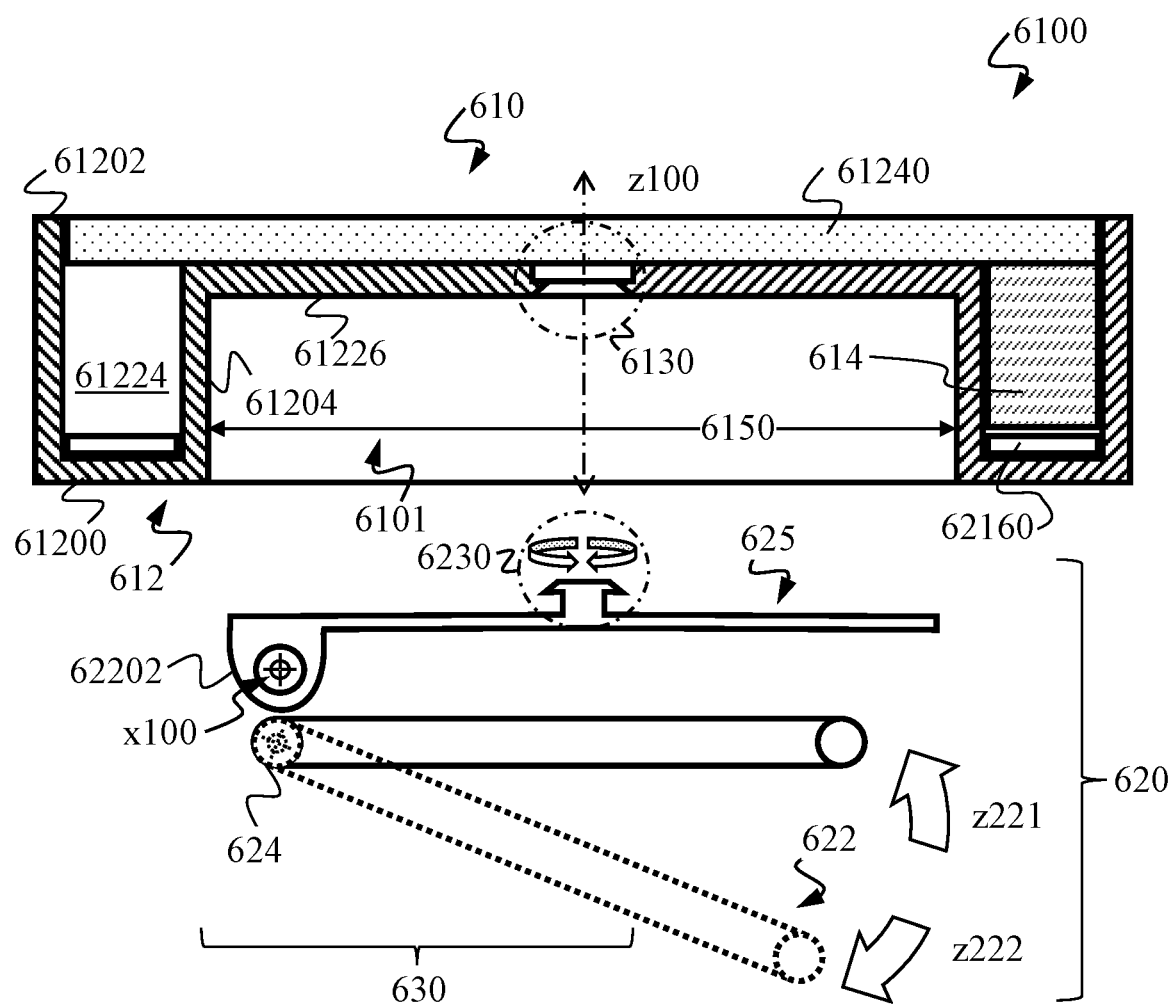
FIG. 6 shows an exploded cross-sectional schematic side view according to an embodiment.

FIG. 6 shows an exploded cross-sectional schematic side view of a mobile device holder 6100 according to embodiment. The mobile device holder 6100 includes an attachment assembly 610 and a support assembly 620. The attachment assembly 610 includes a base shell 612 having a ring-shaped bottom wall 61200, an outer wall 61202, an inner wall 61204, and a top wall 61226. The inner wall 61204 bounds an inner region 6150 of the mobile device holder 6100. The inner wall 61204 has a height z61204 parallel to the primary axis z100. The outer wall 61202 surrounds the inner wall 61204. The outer wall has a height z61202 taller than the inner wall's height z61204 in the direction parallel to the primary axis z100. The ring-shaped bottom wall 61200 extends radially between a bottom edge portion of the outer wall 61202 and a bottom edge portion of the inner wall 61204 to form a concave magnet groove portion 61224 that holds the magnet 614 between the outer wall 61202, the inner wall 61204, and the ring-shaped bottom wall 61200. In some embodiments, the magnet 614 is fixed to a support piece 62160, which may be fixed to the ring-shaped bottom wall 61200 by an adhesive, such as glue or epoxy. The top wall 61226 extends radially between top edge portions of the inner wall 61204 to form an accommodating recess 6101 in the inner region 6150. A cover body 61240 is fixed by an adhesive, such as glue or epoxy, to the top wall 61226. In the center of the top wall 61226 is a support connection part 6130 that engages with an assembly connection part 6230 on a rotatable disk part 625 of the support assembly 620. The engagement between the support connection part 6130 and the assembly connection part 6230 permits the rotatable disk part 625 to rotate around the primary axis z100 in relation to the attachment assembly 610.

Still referring to FIG. 6, the support assembly 620 includes the rotatable disk part 625, the assembly connection part 6230, and a shaft seat 62202. A handle portion 622 includes a rotatable part 624 that engages with the shaft seat 62202 to permit the handle portion 622 to rotate around a secondary axis x100 in relation to the rotatable disk part 625. The secondary axis x100 is perpendicular to the primary axis z100. In use, the handle portion 622 is movable between the closed position z221 and the open position z222. A hinge portion 630 includes the support connection part 6130, the assembly connection part 6230, the shaft seat 62202, and the rotatable part 624. Thus, the hinge portion 630 permits combinations of rotation about the primary axis z100 and the secondary axis x100.

Figure 7A:
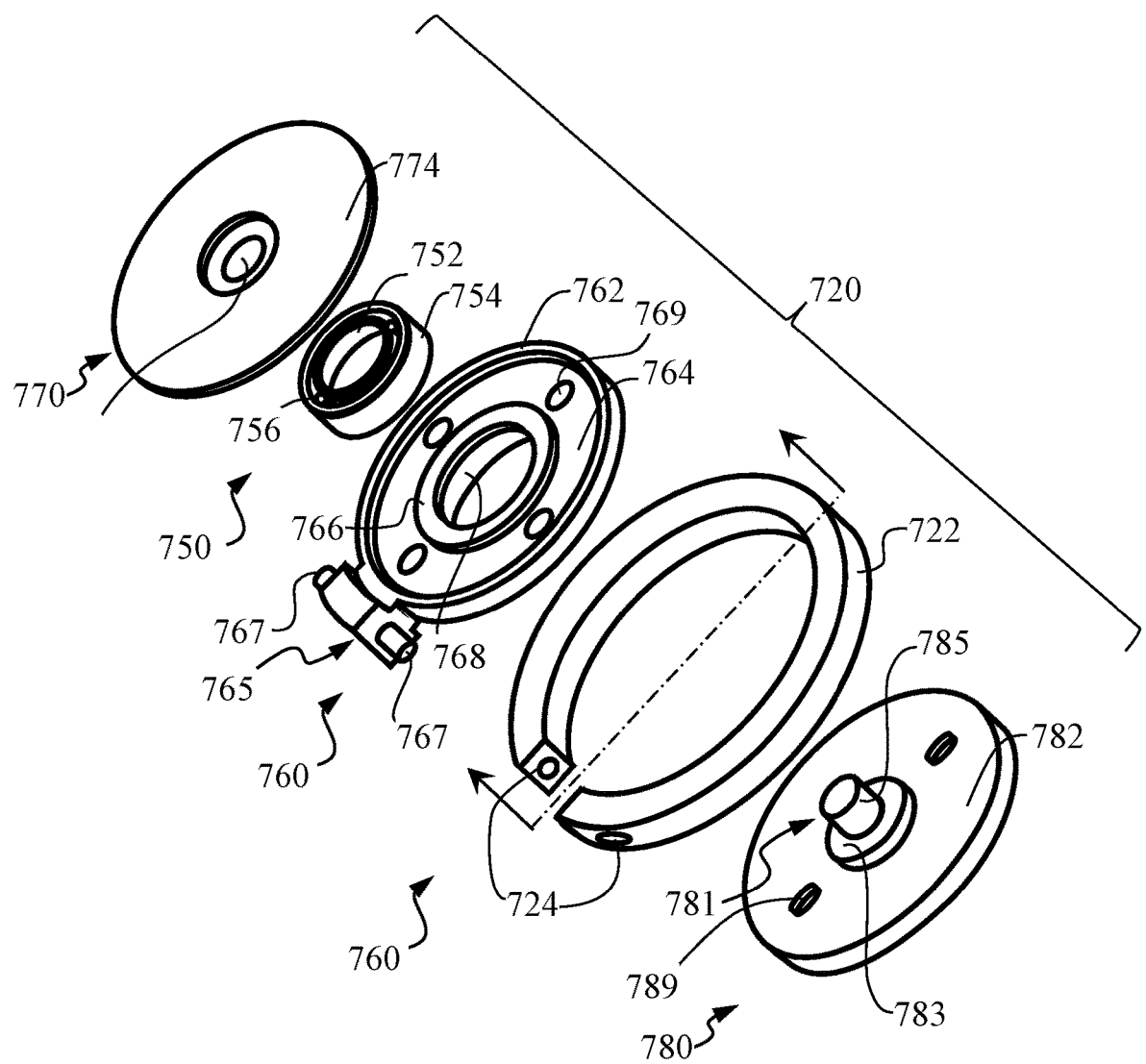
FIG. 7A shows an exploded perspective view according to an embodiment.

FIG. 7A shows an exploded perspective view of a support assembly 720 according to an embodiment.

Figures 7B, 7C:
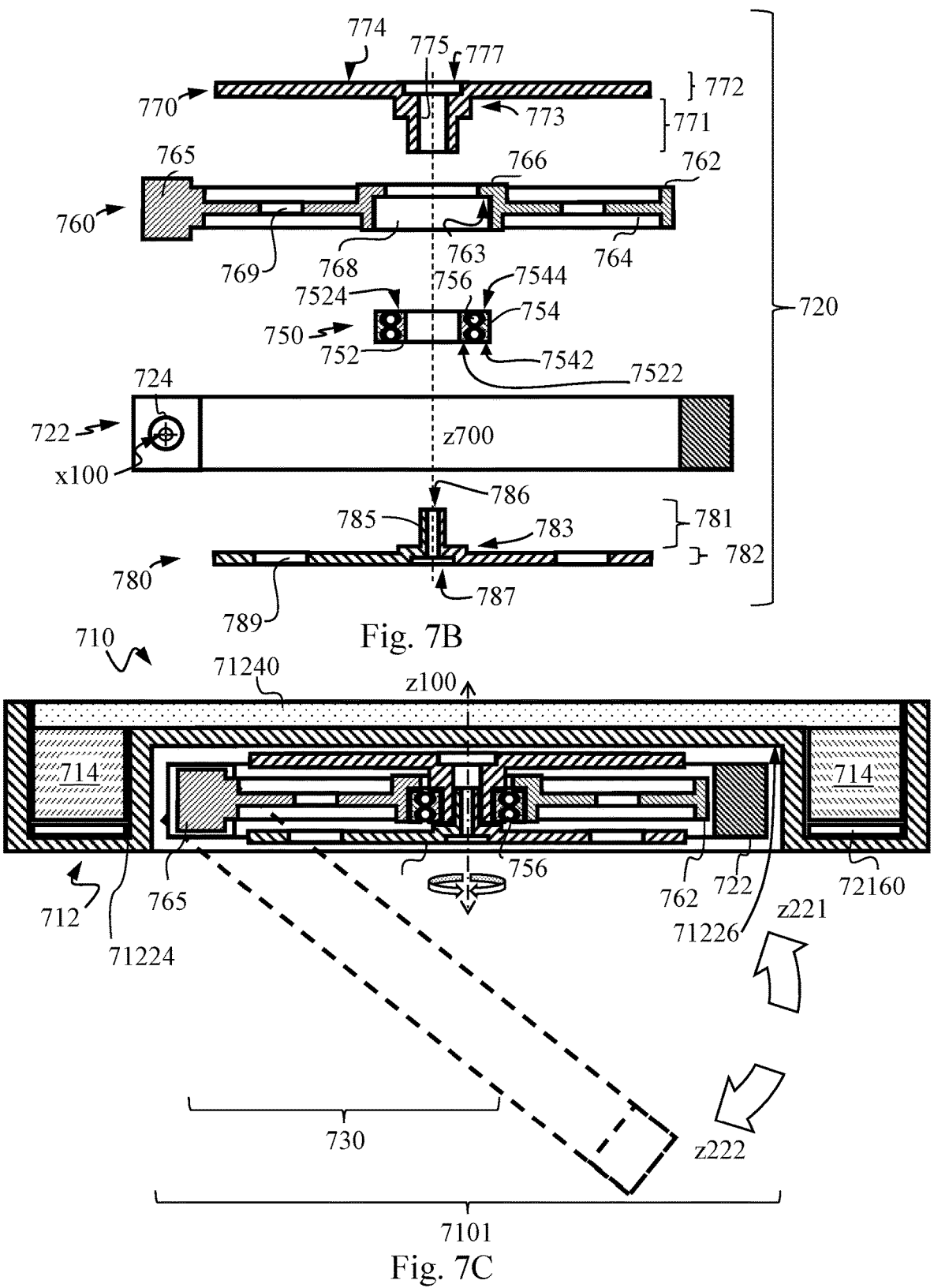
FIG. 7B shows an exploded cross-sectional side view according to an embodiment.
FIG. 7C shows a schematic cross-sectional side view according to an embodiment.

FIG. 7B shows an exploded cross-sectional side view of the support assembly 720 according to an embodiment.

FIG. 7C shows a schematic cross-sectional side view of the support assembly 720 assembled for use with an attachment assembly 710 according to an embodiment. The support assembly 720 includes a handle portion 722, a bearing 750, a hub 760, a mounting plate 770, and a cover plate 780. The handle portion 722 has the shape of a hoop, or in other words, an incomplete ring. On an open side of the handle portion 722 are opposing rotatable parts 724, formed as orifices that extend along a common axis through the handle portion 722. The bearing 750 includes an inner race 752, an outer race 754, and a plurality of balls 756 between the inner race 752 and the outer race 754. In other embodiments the bearing 750 is replaced with a roller bearing, a needle bearing, or a bushing. The inner race 752 has a bottom side 7522 and a top side 7524. The outer race 754 has a bottom side 7542 and a top side 7544.

Still referring to FIGS. 7A through 7C, the hub 760 includes an outer rim 762, an inner rim 766, and a web 764 that connects the outer rim 762 to the inner rim 766. In some embodiments, one or more apertures 769 extend through the web 764. The inner rim 766 includes an inner sleeve 768 with a cylindrical wall of diameter larger than or equal to an outer diameter of the outer race 754 of the bearing 750. On one end of the inner sleeve 768, the inner rim 766 includes a bearing shoulder 763 with a diameter smaller than the inner sleeve 768 and larger than the inner race 752 of the bearing. When assembled, the bearing shoulder 763 rests on the top side 7544 of the outer race 754. Joining the outer rim 762 on one side of the hub 760 is a pintle block 765 having the general form of a rectangular prism with two pin parts 767 extending from opposing sides tangent to the circumference of the outer rim 762.

Still referring to FIGS. 7A through 7C, the mounting plate 770 includes a disk part 772 and an axle 771 centered on the disk part 772 on one side. An outside attachment surface 774 is on a side of the disk part 772 opposite the axle 771. A portion of the axle 771 nearest the disk part 772 includes a bearing knee 773 with a diameter larger than the axle 771 and smaller than an inner diameter of the outer race 754 of the bearing 750. When assembled, the bearing knee 773 rests against the top side 7524 of the inner race 752 of the bearing 750. The outside attachment surface 774 has a generally flat disk shape. When assembled, the outside attachment surface 774 is fixed against a top wall 71226 of the attachment assembly 710 by an adhesive, such as glue or epoxy. In other embodiments, the mounting plate 770 is omitted and the attachment assembly 710 has an integral axle that extends along the primary axis z100. The inside of the axle 771 includes a generally cylindrical mating surface 775 that engages with a corresponding mating surface 785 of the cover plate 780. In some embodiments, the mating surface 775 and the mating surface 785 are threaded. The mounting plate 770 includes a counterbore 777 on the same side as the outside attachment surface 774.

Still referring to FIGS. 7A through 7C, the cover plate 780 includes a disk part 782 and an axle 781 centered on the disk part 782. A portion of the axle 781 nearest the disk part 782 includes a bearing knee 783 with a diameter larger than the axle 781 and smaller than an inner diameter of the outer race 754 of the bearing 750. When assembled, the bearing knee 783 rests against the bottom side 7522 of the inner race 752 of the bearing 750. In some embodiments, one or more apertures 789 extend through the disk part 782. The outside of the axle 781 includes the mating surface 785 that engages with the mating surface 775 of the mounting plate 770. The inside of the axle 781 includes a generally cylindrical passage 786 and a counterbore 787 to permit a threaded fastener, such as a bolt or pin, to be inserted therethrough and secured by a corresponding fastener, such as a nut, clevis pin, or snap ring in the counterbore 777 of the mounting plate 770. The arrangement of the bearing 750 between the hub 760 and the mounting plate 770 permits the hub 760 to rotate around the axle 771. When assembled, the axle 771 aligns with the primary axis z100.

Still referring to FIGS. 7A through 7C, the attachment assembly 710 includes a base shell 712 and a cover body 71240, in between which is formed a magnet groove portion 71224 that contains a ring-shaped magnet 714 and a support piece 72160. An accommodating recess 7101 is formed in a central portion of the attachment assembly 710, radially inward of the magnet groove portion 71224. The rotatable parts 724 engage with the pin parts 767 to allow rotation around the secondary axis x100. Thus, the handle portion 722 is movable between the open position z222 and the closed position z221. A hinge portion 730 includes the axle 771, the bearing 750, the hub 760, the pins parts 767, and the rotatable parts 724. Thus, the hinge portion 730 permits combinations of rotation about the primary axis z100 and the secondary axis x100.

FIG. 8A shows a schematic top view of an attachment assembly 8110 according to an embodiment. The attachment assembly 8110 includes a base shell 8112 having a top wall 81226, a magnet 814 formed by an inner magnetic unit 8142 and an outer magnetic unit 8144, and a cover body 81240. Some embodiments include a support piece 82160. In some embodiments, the inner magnetic unit 8142 is a single piece. In other embodiments, the inner magnetic unit 8142 includes one or more magnetic sub-units. In some embodiments, the outer magnetic unit 8144 is a single piece. In other embodiments, the outer magnetic unit 8144 includes one or more magnetic sub-units. In some embodiments, the inner magnetic unit 8142 and the outer magnetic unit 8144 are circumferentially aligned and formed together as a single piece.

FIG. 8B shows a schematic cross-sectional side view of the attachment assembly 8110, according to an embodiment. The magnet 814 radially surrounds the accommodating recess 8101.

FIG. 8C shows a detailed schematic cross-sectional side view of the magnet 814 according to an embodiment. The inner magnetic unit 8142 includes a circular array of inner magnetic sub-units. The outer magnetic unit 8144 includes a circular array of outer magnetic sub-units radially spaced apart from the inner magnetic sub-units. The inner magnetic unit 8142 forms a dipole aligned parallel to the primary axis z100. The outer magnetic unit 8144 forms a dipole parallel to the primary axis z100. The radial space between the inner magnetic unit 8142 and the outer magnetic unit 8144 forms a non-magnetized zone 813. In various embodiments, the non-magnetized zone 813 has a magnetic flux density parallel to the primary axis z100 of magnitude less than 80 mT, less than 60 mT, or less than 40 mT. In some embodiments, the non-magnetized zone 813 is omitted. Each of the outer magnetic sub-units has a North pole oriented toward the top side of the base shell 8112. Each of the inner magnetic sub-units has a South pole oriented toward the top side of the base shell 8112.

Still referring to FIG. 8C, the inner magnetic unit 8142 has a width y42, the outer magnetic unit 8144 has a width y44, and the non-magnetized zone 813 has a width y13. In some embodiments the width y42 of the inner magnetic unit 8142 equals the width y44 of the outer magnetic unit 8144. In various embodiments, the width y42 of the inner magnetic unit 8142 is from 0.950 to 1.200 mm, from 1.100 to 1.350 mm, or 1.150 mm; the width y44 of the outer magnetic unit 8144 is from 0.950 to 1.200 mm, from 1.100 to 1.350 mm, or 1.150 mm FIG. 9A shows a schematic top view of an attachment assembly 8210 according to an embodiment. The attachment assembly 8210 includes a base shell 8212 having a top wall 81226, a magnet 824 formed by an inner magnetic unit 8242, and a cover body 81240. Some embodiments include a support piece 82160.

FIG. 9B shows a schematic cross-sectional side view of the attachment assembly 8210, according to an embodiment. The magnet 824 radially surrounds the accommodating recess 8101.

FIG. 9C shows a detailed schematic cross-sectional side view of the magnet 824 according to an embodiment. The inner magnetic unit 8242 is a single piece. The outer magnetic unit 8244 is a single piece. The outer magnetic unit 8244 has its North pole oriented toward the top side of the base shell 8212. The inner magnetic unit 8242 has its South pole oriented toward the top side of the base shell 8212.

FIG. 10A shows a schematic top view according to an embodiment. An attachment assembly 8310 includes a base shell 8312 having a top wall 81226, a magnet 834 formed by an inner magnetic unit 8342 and an outer magnetic unit 8344, and a cover body 81240. Some embodiments include a support piece 82160.

FIG. 10B shows a schematic cross-sectional side view of the attachment assembly 8310, according to an embodiment. The magnet 834 radially surrounds the accommodating recess 8101.

FIG. 10C shows a detailed schematic cross-sectional side view of the magnet 834 according to an embodiment. The inner magnetic unit 8342 includes a circular array of inner magnetic sub-units. The outer magnetic unit 8344 includes a circular array of outer magnetic sub-units. Each of the outer magnetic sub-units in the outer magnetic unit 8344 has a South pole oriented toward the top side of the base shell 8312. Each of the inner magnetic sub-units in the inner magnetic unit 8340 has a North pole oriented toward the top side of the base shell 8312.

FIG. 11A shows a schematic top view according to an embodiment. An attachment assembly 8410 includes a base shell 8412 and a magnet 844 formed by an inner magnetic unit 8442 and an outer magnetic unit 8444. Some embodiments include a support piece 82160.

FIG. 11B shows a schematic cross-sectional side view of the attachment assembly 8410, according to an embodiment. The magnet 844 radially surrounds the accommodating recess 8101.

FIG. 11C shows a detailed schematic cross-sectional side view of the magnet 844 according to an embodiment. The inner magnetic unit 8442 is a single piece. The outer magnetic unit 8444 is a single piece. The outer magnetic unit 8444 has its South pole oriented toward the top side of the base shell 8412. The inner magnetic unit 8442 has its North pole oriented toward the top side of the base shell 8412.

Figure 12B:
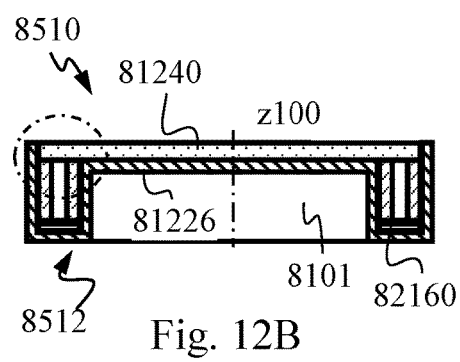
FIG. 12B shows a schematic cross-sectional side view according to an embodiment.
Figure 12A:
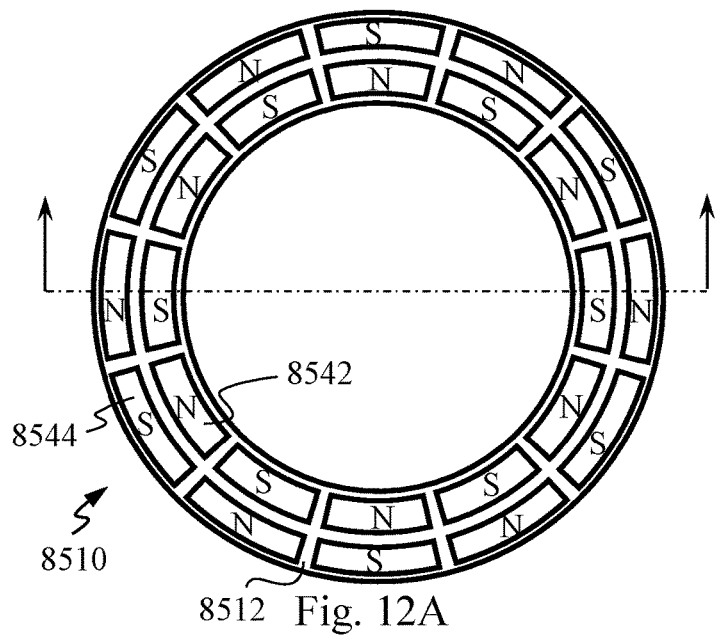
FIG. 12A shows a schematic top view according to an embodiment.

FIG. 12A shows a schematic top view according to an embodiment. An attachment assembly 8510 includes a base shell 8512 having a top wall 81226, a magnet 854 formed by an inner magnetic unit 8542 and an outer magnetic unit 8544, and a cover body 81240. Some embodiments include a support piece 82160.

FIG. 12B shows a schematic cross-sectional side view of the attachment assembly 8510, according to an embodiment. The magnet 854 radially surrounds the accommodating recess 8101.

Figure 12C:
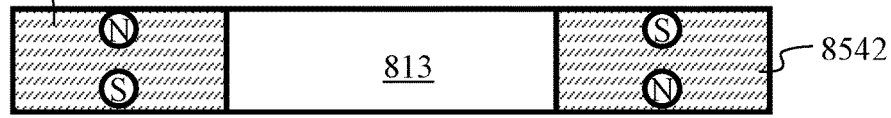
FIG. 12C shows a detailed schematic view according to an embodiment.

FIG. 12C shows a detailed schematic cross-sectional side view of the magnet 854 according to an embodiment. The inner magnetic unit 8542 includes a circular array of inner magnetic sub-units. The outer magnetic unit 8544 includes a circular array of outer magnetic sub-units radially spaced apart from the inner magnetic sub-units. Each of the inner magnetic sub-units in the inner magnetic unit 8542 forms a local dipole aligned parallel to the primary axis z100. Each of the outer magnetic sub-units of the outer magnetic unit 8544 forms a local dipole aligned parallel to the primary axis z100. Circumferentially neighboring outer magnetic sub-units of the outer magnetic unit 8544 have alternately opposing poles oriented toward the top side of the base shell 8512. Circumferentially neighboring inner magnetic sub-units of the inner magnetic unit 8542 have alternately opposing poles oriented toward the top side of the base shell 8512. Radially neighboring inner magnetic sub-units and outer magnetic sub-units have opposing poles oriented toward the top side of the base shell 8512.

Devices intended to improve a user's grip on a mobile device often are bulky, tend to scratch or permanently mar the mobile devices to which they are attached, and are only able to be affixed to surfaces that are smooth and clean. By contrast, embodiments in accordance with the present disclosure overcome these and other shortcomings.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A mobile device holder, comprising:
    an attachment assembly configured to produce a magnetic force parallel to a primary axis of the mobile device holder; and
    a support assembly connected to the attachment assembly, the support assembly including a handle portion movable between a closed position proximal to the attachment assembly and an open position distal from the attachment assembly;
    wherein the attachment assembly comprises:
        a shell,
        a magnet enclosed inside the shell, and
        a support connection part configured to engage a corresponding attachment connection part of the support assembly;
    wherein the shell comprises:
        an inner wall that bounds an inner region and has a height in the primary axial direction;
        an outer wall that surrounds the inner wall and has a height in the primary axial direction; and
        a base wall that extends radially between a bottom edge portion of the outer wall and a bottom edge portion of the inner wall to form a concave magnet groove portion to hold the magnet between the outer wall, the inner wall, and the base wall.

2. The mobile device holder of claim 1, wherein the primary axis is normal to a contact surface of the attachment assembly.

3. A system, comprising:
    the mobile device holder of claim 1; and
    a mobile device.

4. The mobile device holder of claim 1, wherein a detent clip connects the support assembly to the attachment assembly.

5. The mobile device holder of claim 4, wherein the detent clip has a circular profile to permit the support assembly to rotate in relation to the attachment assembly.

6. The mobile device holder of claim 1, wherein a joint portion connects the handle portion to the support assembly.

7. The mobile device holder of claim 6, wherein the joint portion includes a foldable segment.

8. The mobile device holder of claim 6, wherein the joint portion includes a rotatable part configured to rotate about a secondary axis not parallel to the primary axis.

9. The mobile device holder of claim 8, wherein the secondary axis is perpendicular to the primary axis.

10. The mobile device holder of claim 1, wherein the concave magnet groove portion has a ring shape.

11. The mobile device holder of claim 1, wherein the shell further comprises:
    a top wall that extends radially between top edge portions of the inner wall to form an accommodating recess in the inner region;
    wherein the top wall extends radially between a top edge portion of the inner wall and a top edge portion of the outer wall to enclose the concave magnet groove portion.

12. The mobile device holder of claim 11, further comprising:
    a cover that extends radially between a top edge portion of the inner wall and a top edge portion of the outer wall to enclose the concave magnet groove portion.

13. The mobile device holder of claim 12, wherein the cover abuts the top wall on a side of the top wall opposite the accommodating recess.

14. The mobile device holder of claim 11, wherein the support connection part engages the attachment connection part at a location in the top wall where the inner wall radially surrounds the attachment connection part inside the accommodating recess.

15. The mobile device holder of claim 1, wherein the magnet has a ring shape.

16. The mobile device holder of claim 15, wherein the magnet is formed as a single piece.

17. The mobile device holder of claim 15, wherein the magnet includes a plurality of magnetic units.

18. The mobile device holder of claim 17, wherein each of the magnetic units has an arcuate shape, and the plurality of magnetic units form an intermittent ring structure.

19. The mobile device holder of claim 1, further comprising:
   a support piece that adjoins the magnet and extends in a circumferential direction inside the concave magnet groove portion.

20. The mobile device holder of claim 15, wherein the magnet includes an inner magnetic unit and an outer magnetic unit, the inner and outer magnetic units being radially spaced apart, and each of the inner and outer magnetic units forming a dipole aligned parallel to the primary axis.

21. The mobile device holder of claim 20, wherein the inner magnetic unit and the outer magnetic unit are circumferentially aligned and formed together as a single piece.

22. The mobile device holder of claim 20, wherein the radial space between the inner and outer magnetic units forms a non-magnetized zone.

23. The mobile device holder of claim 20, wherein the outer magnetic unit has a North pole oriented toward a top side of the shell, and
   the inner magnetic unit has a South pole oriented toward the top side of the shell.

24. The mobile device holder of claim 20, wherein the outer magnetic unit has a South pole oriented toward a top side of the shell, and
   the inner magnetic unit has a North pole oriented toward a top side of the shell.

25. The mobile device holder of claim 20, wherein the inner magnetic unit includes an inner array of magnetic sub-units and the outer magnetic unit includes an outer array of magnetic sub-units, each of the magnetic sub-units of the inner and outer arrays forming a local dipole aligned parallel to the primary axis.

26. The mobile device holder of claim 25, wherein each of the magnetic sub-units of the outer array has a North pole oriented toward a top side of the shell, and each of the magnetic sub-units of the inner array has a South pole oriented toward the top side of the shell.

27. The mobile device holder of claim 25, wherein circumferentially neighboring magnetic sub-units of the arrays have alternately opposing poles oriented toward a top side of the shell, and wherein radially neighboring magnetic sub-units of the arrays have opposing poles oriented toward the top side of the shell.

28. The mobile device holder of claim 8, further comprising:
   an axle that extends from the attachment assembly along the primary axis;
   a bearing mounted on the axle; and
   a hub mounted on the bearing to rotate relative to the attachment assembly about the primary axis, wherein the rotatable part that is configured to rotate about the secondary axis pivotally connects to the hub at the secondary axis.

* * * * *